US012194726B2

(12) United States Patent
Schmidt et al.

(10) Patent No.: US 12,194,726 B2
(45) Date of Patent: *Jan. 14, 2025

(54) HEAT PRESS, ESPECIALLY KNEE LEVER-TRANSFER PRESS

(71) Applicant: NEPATA SYSTEMS GMBH, Wolnzach (DE)

(72) Inventors: Bernhard Schmidt, Pörnbach (DE); Oliver Tiedemann, Pfaffenhofen (DE); Fabian Franke, Pfaffenhofen (DE); Konstantin Köppe, Geisenfeld (DE); Robert Schmidt, Bad Feilnbach (DE)

(73) Assignee: NEPATA SYSTEMS GMBH, Wolnzach (DE)

( * ) Notice: Subject to any disclaimer, the term of this patent is extended or adjusted under 35 U.S.C. 154(b) by 2 days.

This patent is subject to a terminal disclaimer.

(21) Appl. No.: 18/065,423

(22) Filed: Dec. 13, 2022

(65) Prior Publication Data

US 2023/0112721 A1 Apr. 13, 2023

Related U.S. Application Data

(63) Continuation of application No. 15/728,440, filed on Oct. 9, 2017, now Pat. No. 11,559,981.

(30) Foreign Application Priority Data

Mar. 6, 2017 (DE) ..................... 20 2017 101 248.4

(51) Int. Cl.
*B41F 33/16* (2006.01)
*B30B 15/34* (2006.01)
(Continued)

(52) U.S. Cl.
CPC .............. *B41F 33/16* (2013.01); *B30B 15/34* (2013.01); *B41F 16/0046* (2013.01); *B41F 16/02* (2013.01)

(58) Field of Classification Search
CPC ...... B41F 16/02; B41F 16/0046; B41F 33/16; B30B 15/34; B30B 1/04; B30B 1/12; B30B 15/064
See application file for complete search history.

(56) References Cited

U.S. PATENT DOCUMENTS 4,004,503 A * 1/1977 Dwyer .................... B44B 5/028 156/583.9
4,058,055 A * 11/1977 Douglas ............. D06B 11/0076 101/10

(Continued)

OTHER PUBLICATIONS

Cinder Sensing Cooker, “Cinder” (Year: 2016).*
Fusion Operator’s Manual, “Fusion” (Year: 2013).*

*Primary Examiner* — David H Banh
(74) *Attorney, Agent, or Firm* — McCoy Russell LLP

(57) ABSTRACT

The present disclosure relates to a heat press, especially knee lever-transfer press with at least one socket, with at least one base plate and with at least one heatable counter plate pivotable towards the base plate, wherein the knee lever-transfer press further has a control unit, by which the knee lever-transfer press is controllable in an open-loop manner and/or closed-loop manner and wherein the control unit constitutes a first modular unit of the knee lever-transfer press and wherein the socket constitutes at least one second modular unit, and the base plate and the counter plate constitute at least one third modular unit and wherein at least the first modular unit and the second modular unit and/or the third modular unit are separable from each other and/or are formed to be replaceable for functional comparable modular units.

20 Claims, 15 Drawing Sheets

(51) Int. Cl.
*B41F 16/00* (2006.01)
*B41F 16/02* (2006.01)

(56) References Cited

U.S. PATENT DOCUMENTS 4,379,018 A * 4/1983 Griesdorn ................ H05B 3/00 156/359
5,147,496 A * 9/1992 Hix ......................... B41F 16/02 156/583.8
5,252,171 A * 10/1993 Anderson ............... B41F 16/02 156/359
5,435,883 A * 7/1995 Myers ..................... B41F 16/02 156/583.9
5,474,633 A * 12/1995 Myers ..................... B41F 16/00 156/583.8
6,058,834 A * 5/2000 Beckwith .................. B30B 1/12 100/282
6,151,814 A * 11/2000 Raio ..................... D06F 71/026 38/30
2004/0129148 A1* 7/2004 Romano .............. A47J 37/0611 99/388
2007/0017641 A1* 1/2007 Kenney ................... B41F 16/02 156/583.8
2008/0196836 A1* 8/2008 Woods .................. B30B 15/047 156/367
2008/0241306 A1* 10/2008 Goss ....................... B41F 16/02 425/385
2015/0122425 A1* 5/2015 Hsiao ........................ B30B 1/04 156/583.1
2015/0312964 A1* 10/2015 Sorenson ............. H05B 1/0266 219/443.1
2016/0250816 A1* 9/2016 Robinson .................. B30B 1/04 100/35
2017/0165389 A1* 6/2017 Chao .................. B41M 5/38221
2018/0036980 A1* 2/2018 Robinson ............ B41F 16/0046
2018/0361730 A1* 12/2018 Robinson ................ B41F 16/02

* cited by examiner

HEAT PRESS, ESPECIALLY KNEE LEVER-TRANSFER PRESS

CROSS-REFERENCE TO RELATED APPLICATIONS

The present disclosure is a continuation of U.S. Non-Provisional patent application Ser. No. 15/728,440, entitled "HEAT PRESS, ESPECIALLY KNEE LEVER-TRANSFER PRESS," and filed on Oct. 9, 2017. U.S. Non-Provisional patent application Ser. No. 15/728,440 claims priority to German Utility Model Patent Application No. 20 2017 101 248.4, entitled "Heat Press, Especially Knee Lever Transfer Press," filed on Mar. 6, 2017, the entire contents of each of the above-listed applications are hereby incorporated by reference for all purposes.

TECHNICAL FIELD

The present disclosure relates to a heat press, especially a knee lever-transfer press to apply prints as heat transfers.

BACKGROUND AND SUMMARY

Heat press devices are used in the creative and marketing fields to print motifs on plurality of materials, such as clothing, mouse pads, tableware, puzzles, mugs, etc. The motifs may include but not limited to inscriptions, graphic designs, logos, artworks, symbols, trademarks or the like.

An example heat press device is shown in patent application publication WO 2013119785 A1. Therein, a heat press with a control system storing a large number of programs for operating the heat press is described. A user selects a desired program from the stored programs via a scrollable menu shown on a display. Further, a user may select a preset program and modify the preset program as desired to operate the heat press.

The inventors herein have identified potential issues with such an approach. For example, a number of programs that can be stored is limited by the memory of the control system. Further, while programs may be selectable via the scrolling menu, it may be necessary for a user to view multiple program settings before identifying the desired program. Thus, selecting a desired program can be tedious and time consuming. Furthermore, modifying a preset program as desired based on user estimations can lead to errors in setting up appropriate parameters for a heat press action. Consequently, excessive or insufficient temperature, time, or pressure may be applied to the printed material, which may result in wastage of time and resources. Further still, while setting up the heat press parameters, a user may not accurately identify the nature of the material, and may have to go back to the inventory where the material is stored to retrieve the correct information, which again results in wastage of time, and hence, inefficient operation of heat press. Further, when a user desires to use a timesaving approach for a specific material by decreasing a duration of press, the corresponding adjustments to temperature and pressure parameters have to be estimated by the user, which can be time consuming and may lead to estimation errors. As a result, flexibility and accuracy are compromised.

The above-mentioned issues can be at least partially addressed by a heat press, comprising: a socket; a base plate; a heatable counter plate pivotable towards the base plate; and a control unit including a controller and a wireless interface, the controller including executable instructions stored in non-transitory memory for receiving one or more operating parameters from a mobile device, and adjusting one or more actuators of the heat press based on the one or more operating parameters; wherein the control unit is configured as a first modular unit of the press, the socket is configured as a second modular unit, the base plate and the counter plate are configured as a third modular unit; and wherein one or more of the first modular unit, the second modular unit, and the third modular unit are separable from each other.

In this way, the pressing and transfer process can be performed with increased accuracy and speed. Specifically, through the provision of a control unit, the knee lever-transfer press can be partially automatically operated.

Therefore, it is an objective of the present disclosure to provide a knee lever-transfer press as mentioned, which provides an enhanced functionality, especially in that at least a partially automatic procedure is facilitated and to design the knee lever-transfer press to be manageable more easily.

As one example, a heat press like a knee lever-transfer press is equipped with intelligent electronics to realize a half-automatic or even a fully automatic control of the knee lever-transfer press. Further, through the provision of a control unit, which may be built as a module, a retrofitting of the existing knee lever-transfer presses can take place. It is also conceivable to be able to exchange the modules of the knee lever-transfer press against each other to be able to configure the knee lever-transfer press as needed and appropriately. Through the modular assembly, it is furthermore possible to handle the knee lever-transfer press more easily. Therefore, it is possible to provide at least two or more well manageable, transportable shipping units through the dismounting of the knee lever-transfer press in its at least three modules, namely, the control unit, the mechanical unit including at least the socket, as well as the combination of base plate and counter plate. In one example, the modular units of the knee lever-transfer press may not exceed a determined maximal weight, in particular, a maximal weight of approx. 30 kg.

Furthermore, the control unit may include at least one display. Via the control unit and its display, an input can therefore be tracked, but also an input can be specified. For this purpose, for example, a touchscreen can be provided. However, it is also conceivable that these displays are simply displays, which, for example, show operating values or operating parameters.

Further, the knee lever-transfer press is characterized in that the control unit has at least one rotary button, especially a joined rotary—push button. By means of such an input possibility through a rotary button, a simple and intuitive option is provided to be able to enter operating parameters almost continuously or without any steps.

Furthermore, it is also conceivable that the knee lever-transfer press is characterized in that the control unit has at least one actuating button, especially wherein the actuating button is formed as a push button. Via the operating button corresponding operation steps can be triggered. In particular, it is conceivable for the operating buttons to be printed with easily understandable motives in order to display their function.

It can also be provided that the control unit has at least one wireless interface, by which the control unit is coupleable to at least one mobile terminal device. This makes it possible, for example, to be able to monitor the control unit remotely via the mobile terminal device. However, it is also conceivable for the control unit to be controllable via the mobile terminal device and the wireless interface. Information may be exchanged between the mobile terminal device and the control unit. In particular, it is conceivable for the mobile terminal device to have an application (also referred to as "app"), such as a heat press app, in order to obtain operating parameters of the control unit and thus of the knee lever-transfer press in real time, to display the current progress of the operation, and also, through corresponding input options, to be able to influence the knee lever-transfer press, the operating sequence of the knee lever-transfer press, as well as the corresponding open-loop and closed-loop control units of the control unit. In particular, it is conceivable that a complete remote open-loop control and/or remote closed-loop control of the control unit of the knee lever-transfer press are made possible via the app.

The mobile terminal device can be, in particular, a mobile telephone, a smartphone, a tablet PC, or generally a PC or an industrial PC.

It is also possible that the wireless interface is a radio interface, in particular a Bluetooth interface. In particular, it is conceivable that this is a Bluetooth 4.0 interface. This makes possible a simple and unproblematic coupling of the mobile terminal device and the control unit. However, the Bluetooth interface can also be a Bluetooth 4.1 interface, Bluetooth 4.2 interface, Bluetooth 5.0 interface or an even higher-number Bluetooth interface. In addition, a WLAN interface is also conceivable in this context.

In addition, it is conceivable that the control unit is controllable by means of the mobile terminal device via the wireless interface. This allows a remote control and remote waiting function.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Further details and advantages of the present disclosure may be derived from the following description the preferred embodiments described in connection with the drawings.

DETAILED DESCRIPTION

Figure 1:
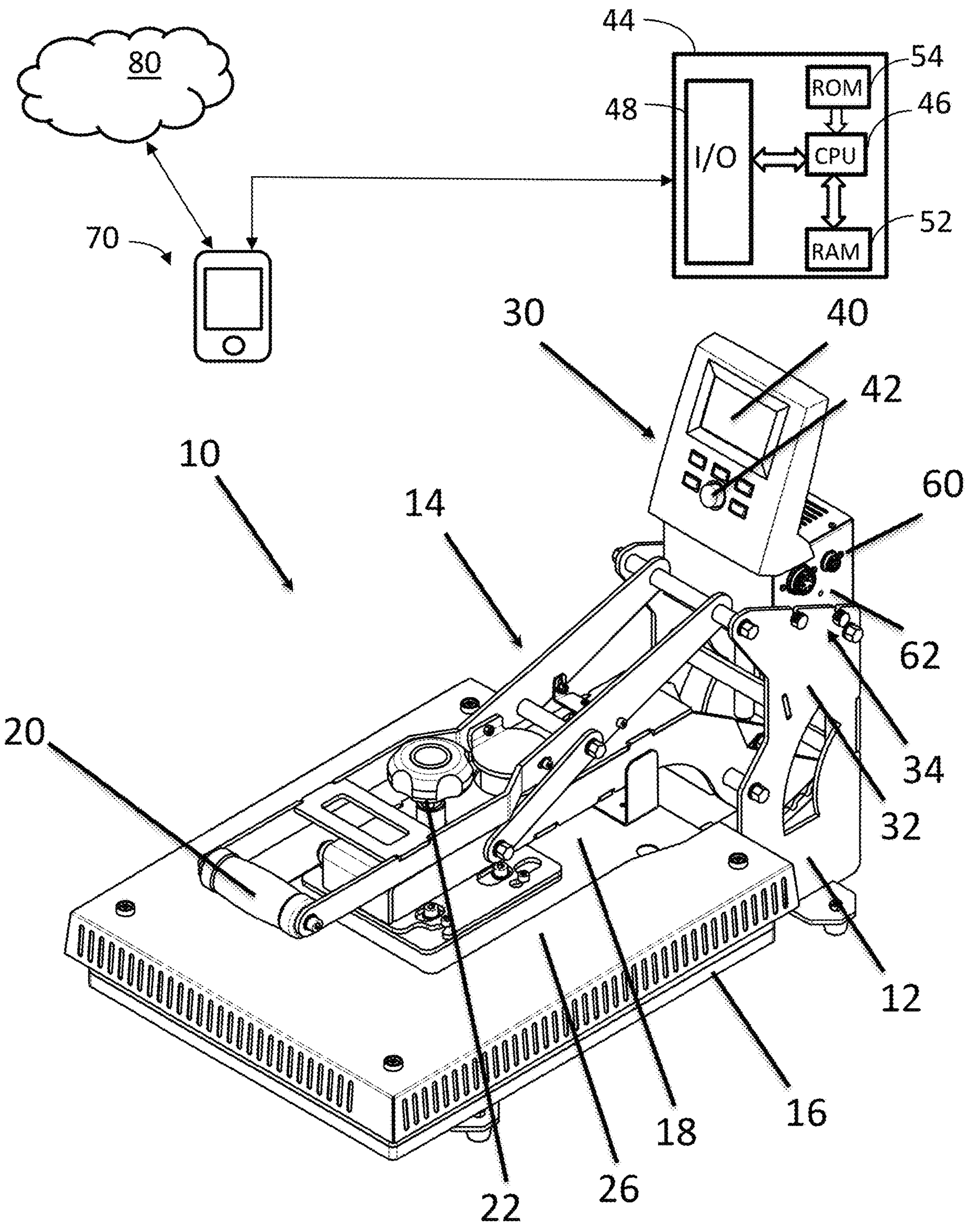
FIG. 1 shows a perspective view of an embodiment of a heat press, such as a knee lever-transfer press, according to the present disclosure.
Figure 6:
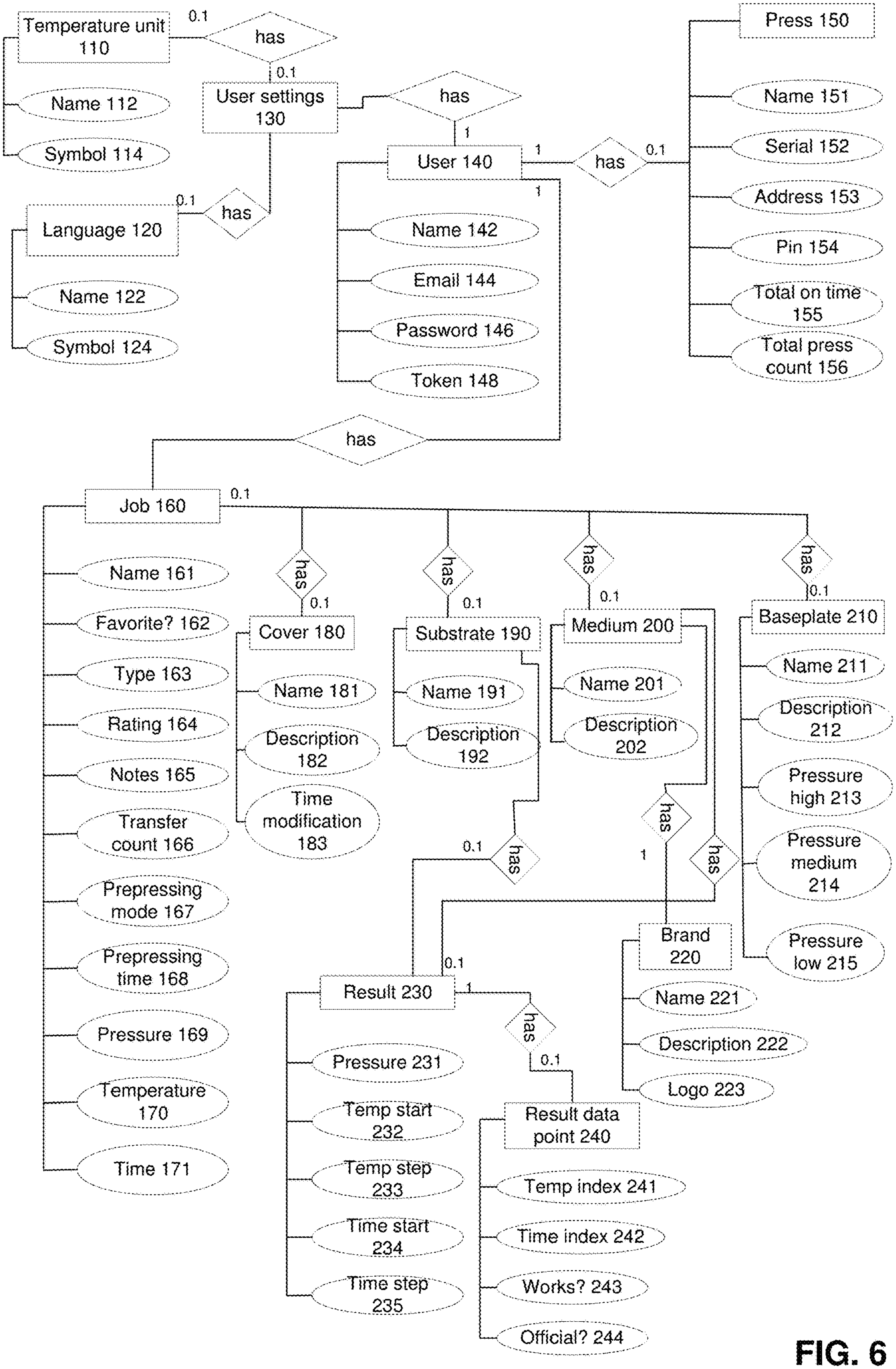
FIG. 6 shows a block diagram of an example data structure and data storage of a heat press app on a mobile device.
Figure 7:
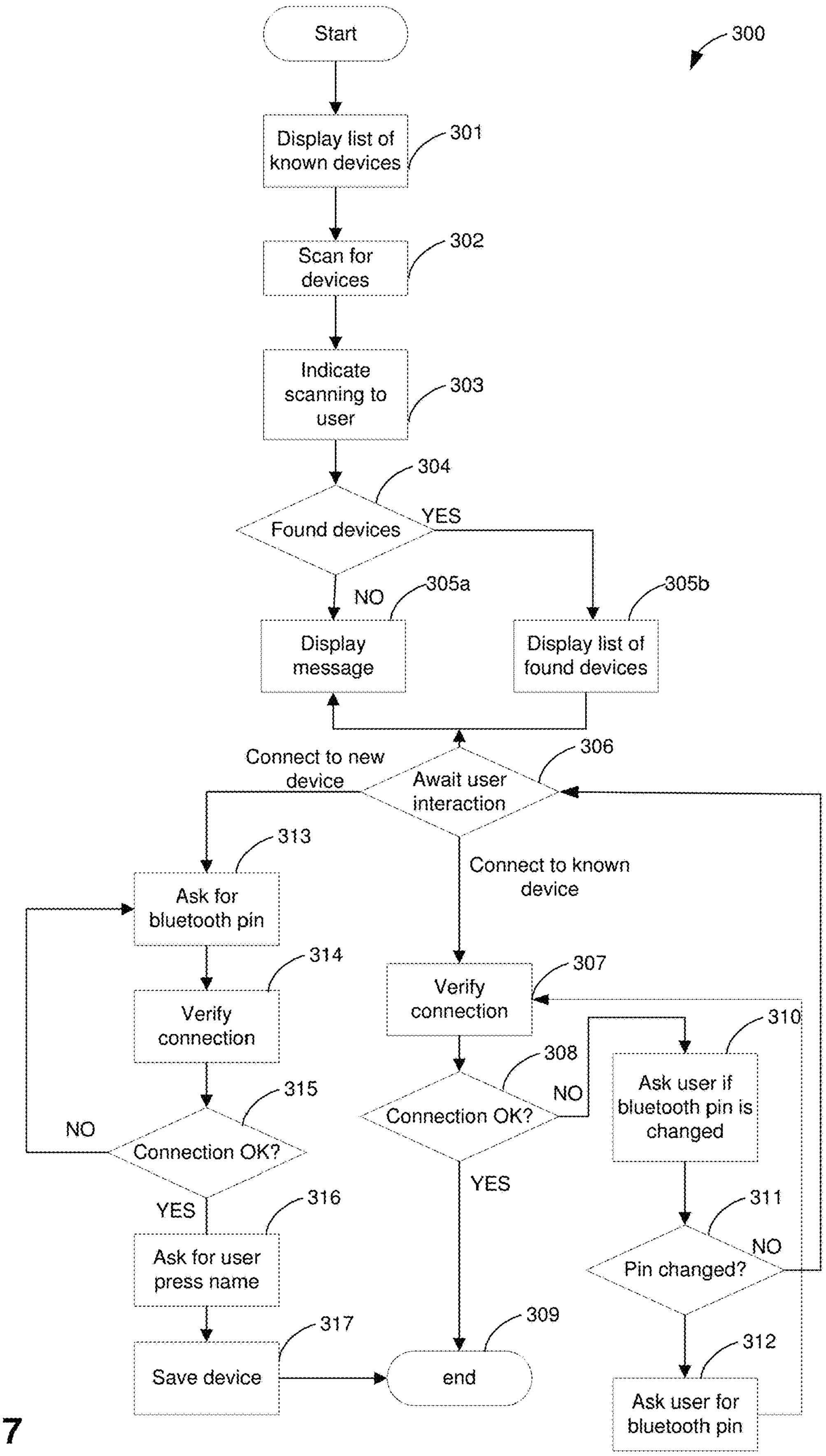
FIG. 7 shows a flow chart illustrating an example method for establishing wireless communication with a heat press app, such as the heat press app of FIG. 6.
Figure 8:
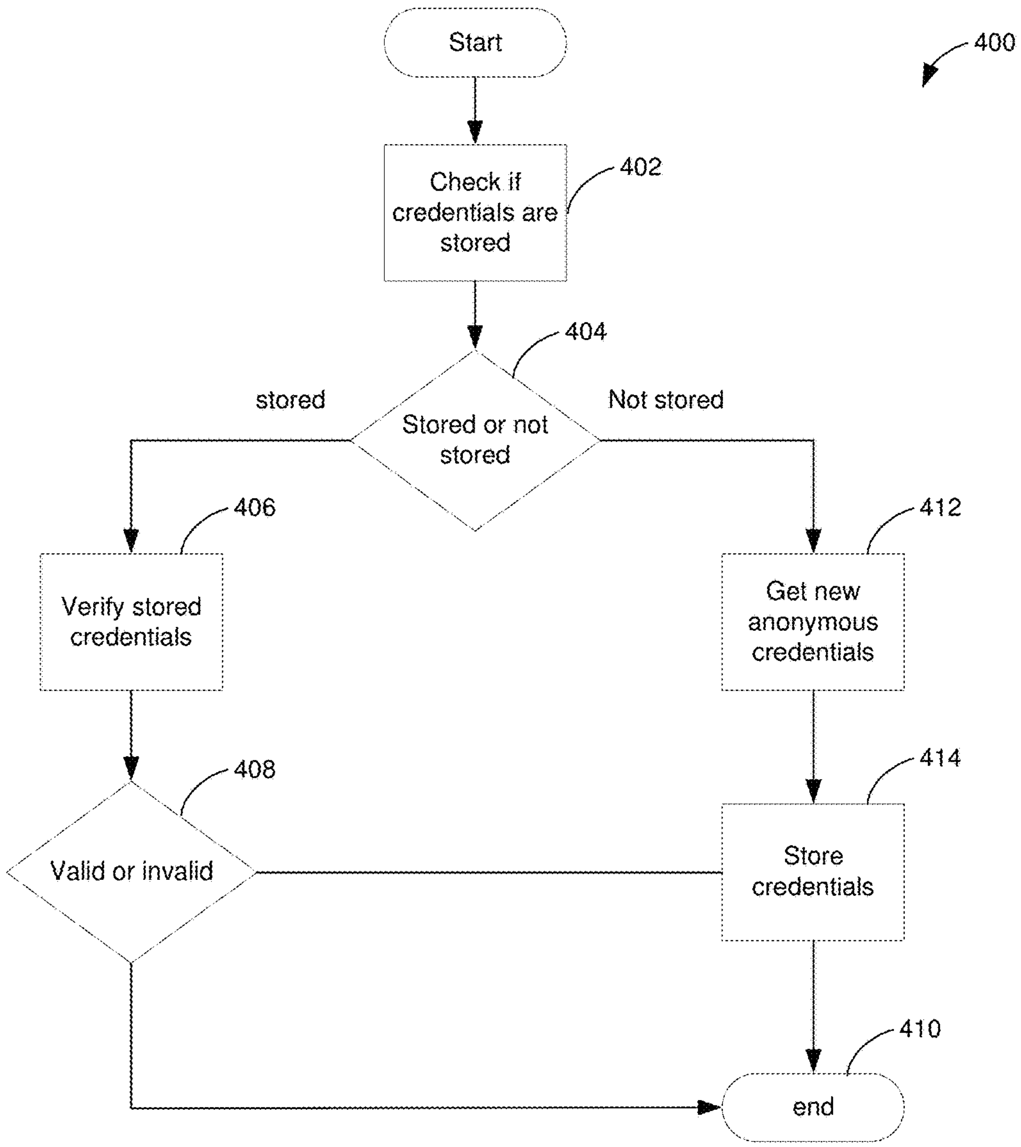
FIG. 8 shows a flow chart illustrating an example method for user authentication for operating a heat press via a heat press app, such as the heat press app of FIG. 6.
Figure 9:
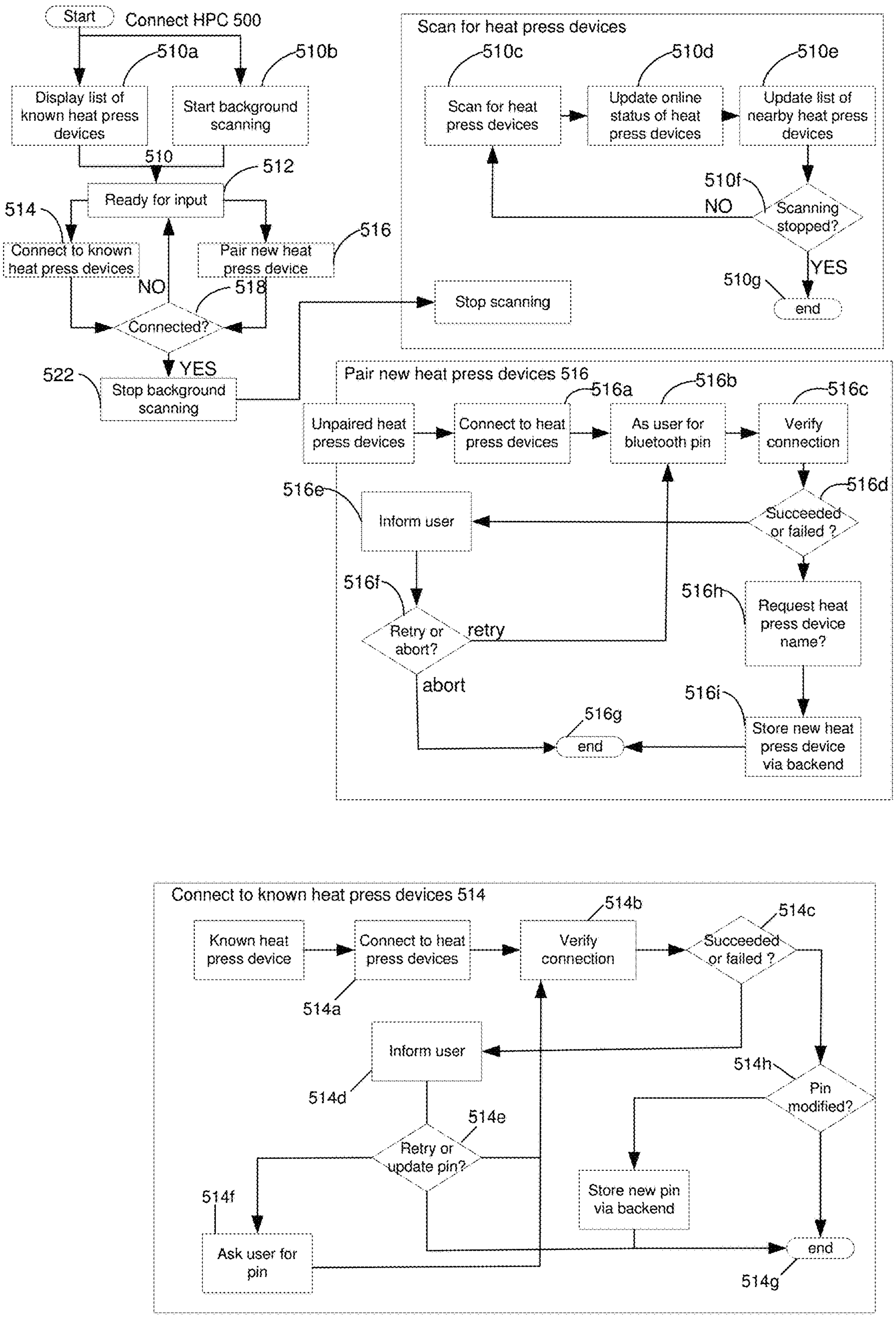
FIG. 9 shows a flow chart illustrating an example method for connecting the heat press app with a heat press app, such as the heat press app of FIG. 6.
Figure 10:
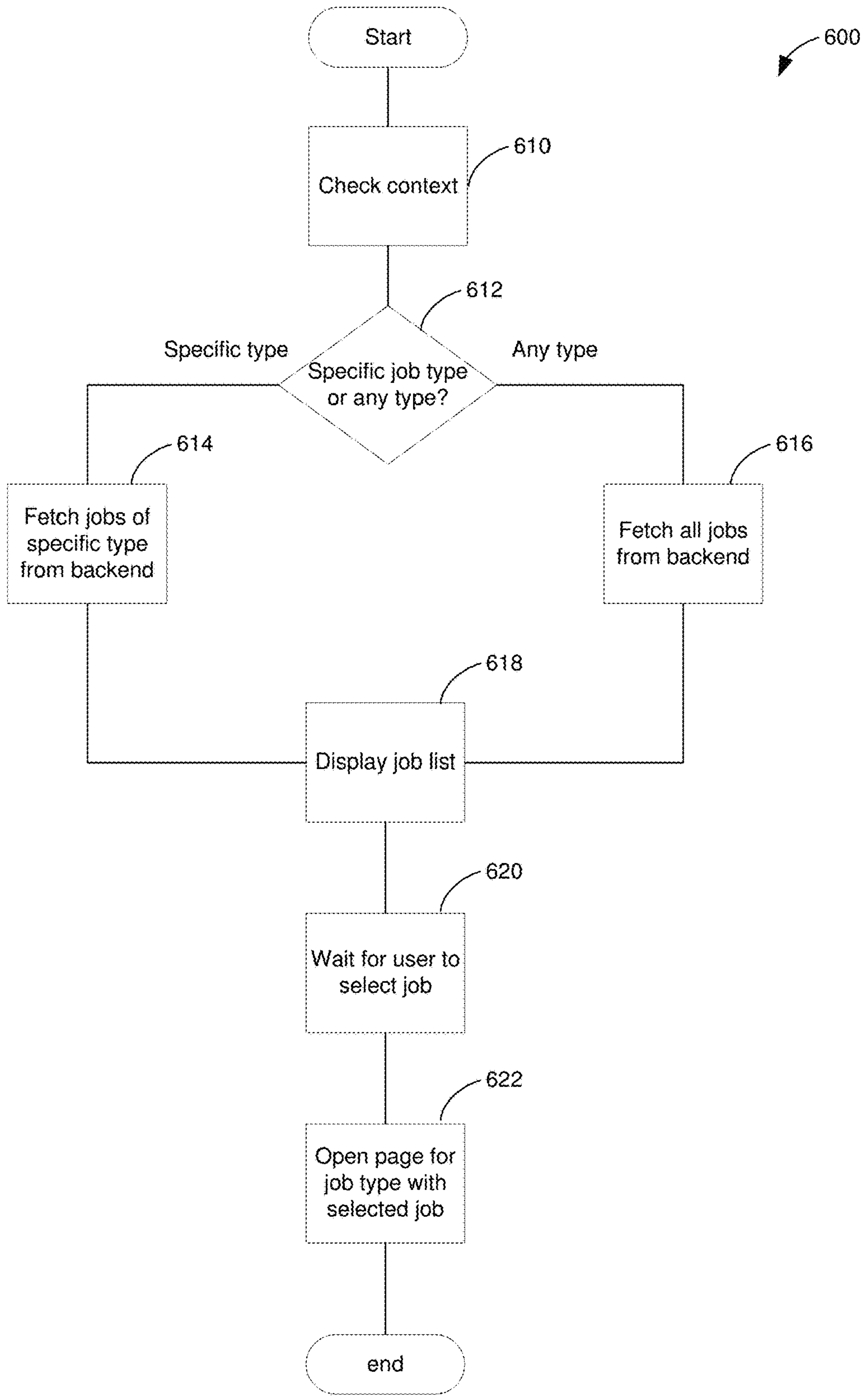
FIG. 10 shows a flow chart illustrating an example method for loading a heat press job via a heat press app, such as the heat press app of FIG. 6.
Figure 11:
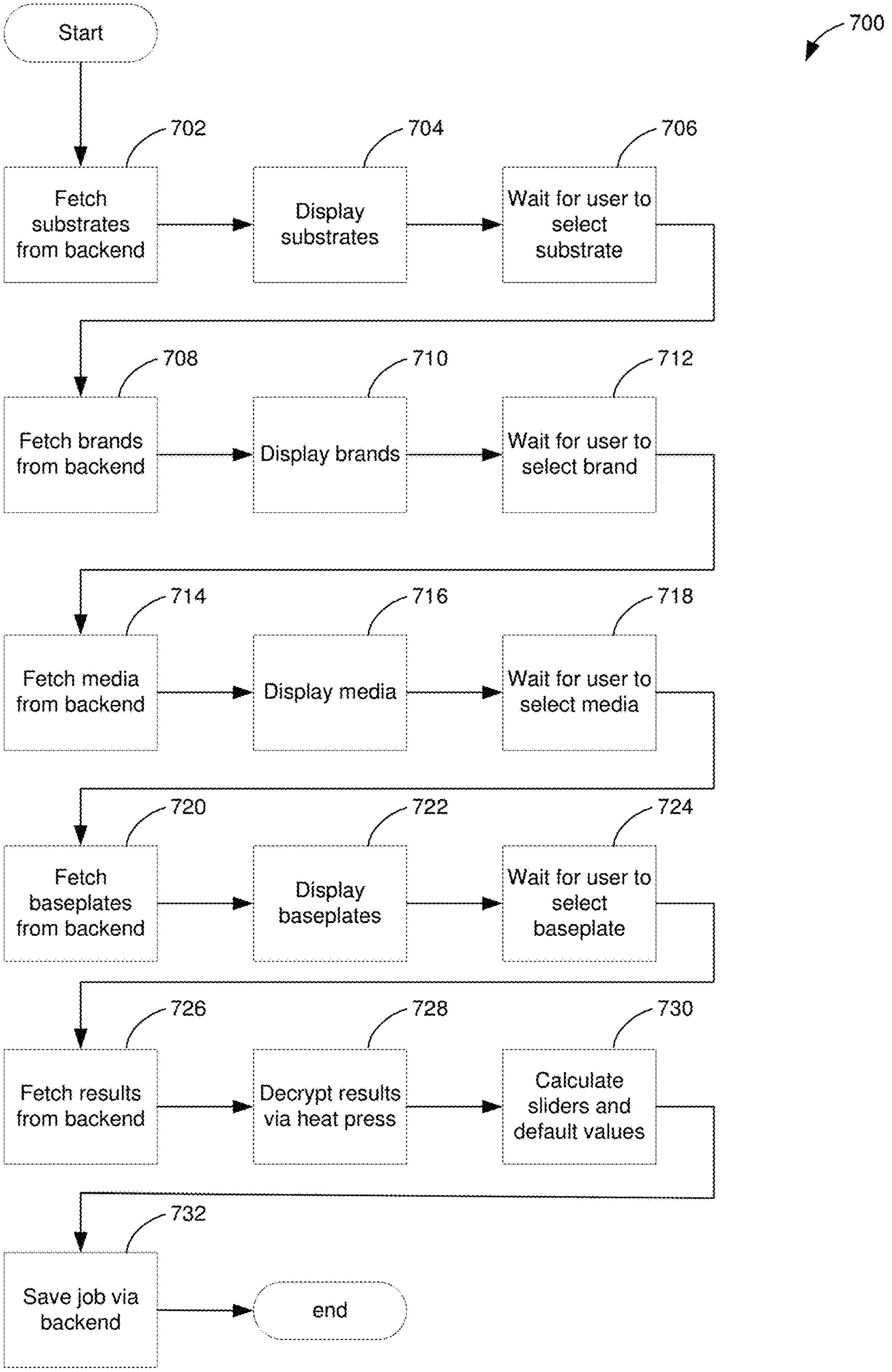
FIG. 11 shows a flow chart illustrating an example method for selecting one or more heat press operation information via a heat press app, such as the heat press app of FIG. 6.
Figure 12:
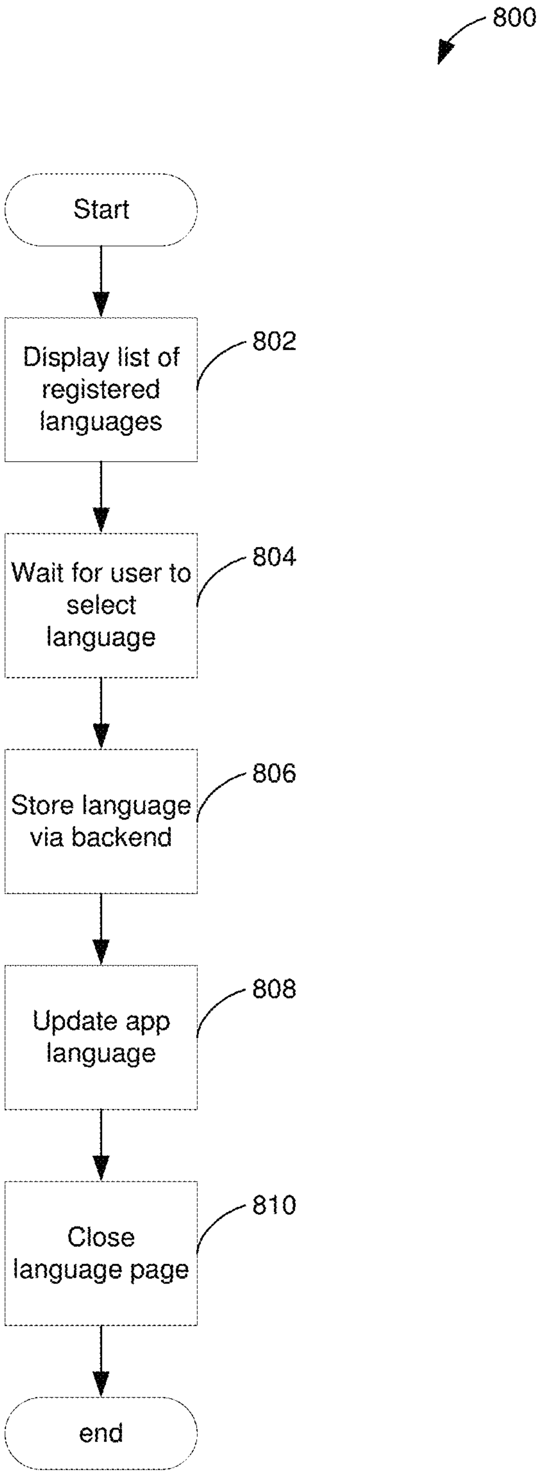
FIG. 12 shows a flow chart illustrating an example method for selecting a language for a heat press app, such as the heat press app of FIG. 6.
Figure 13:
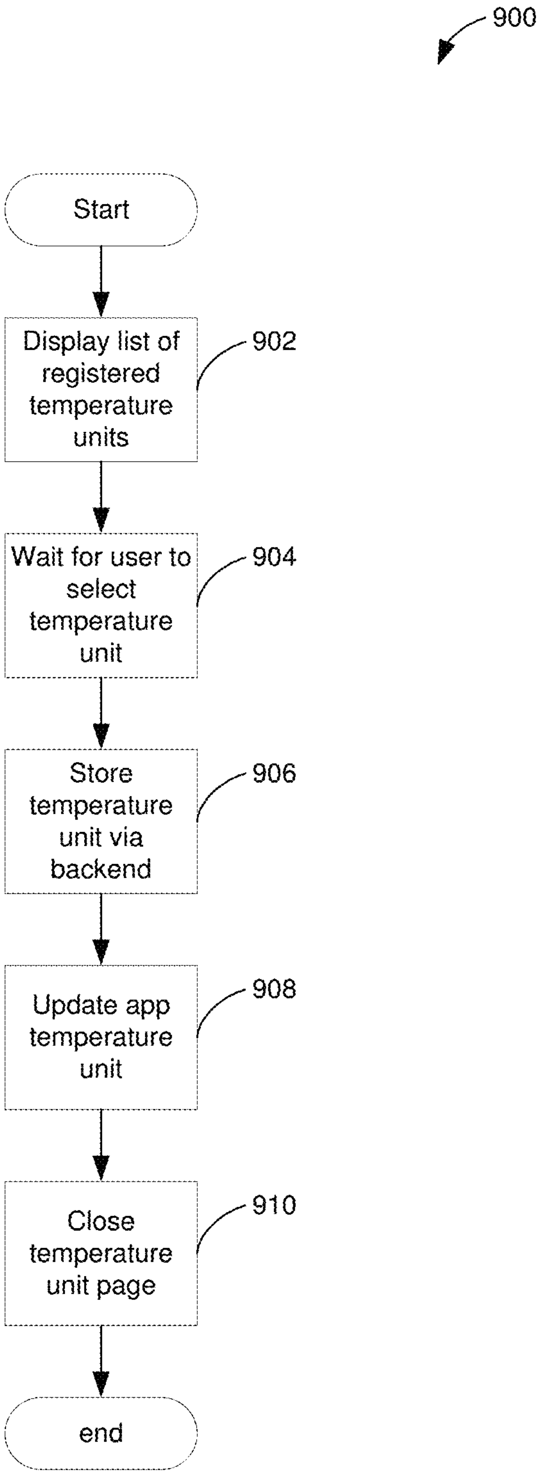
FIG. 13 shows a flow chart illustrating an example method for selecting a desired temperature for a heat press operation via a heat press app, such as the heat press app of FIG. 6.
Figure 14:
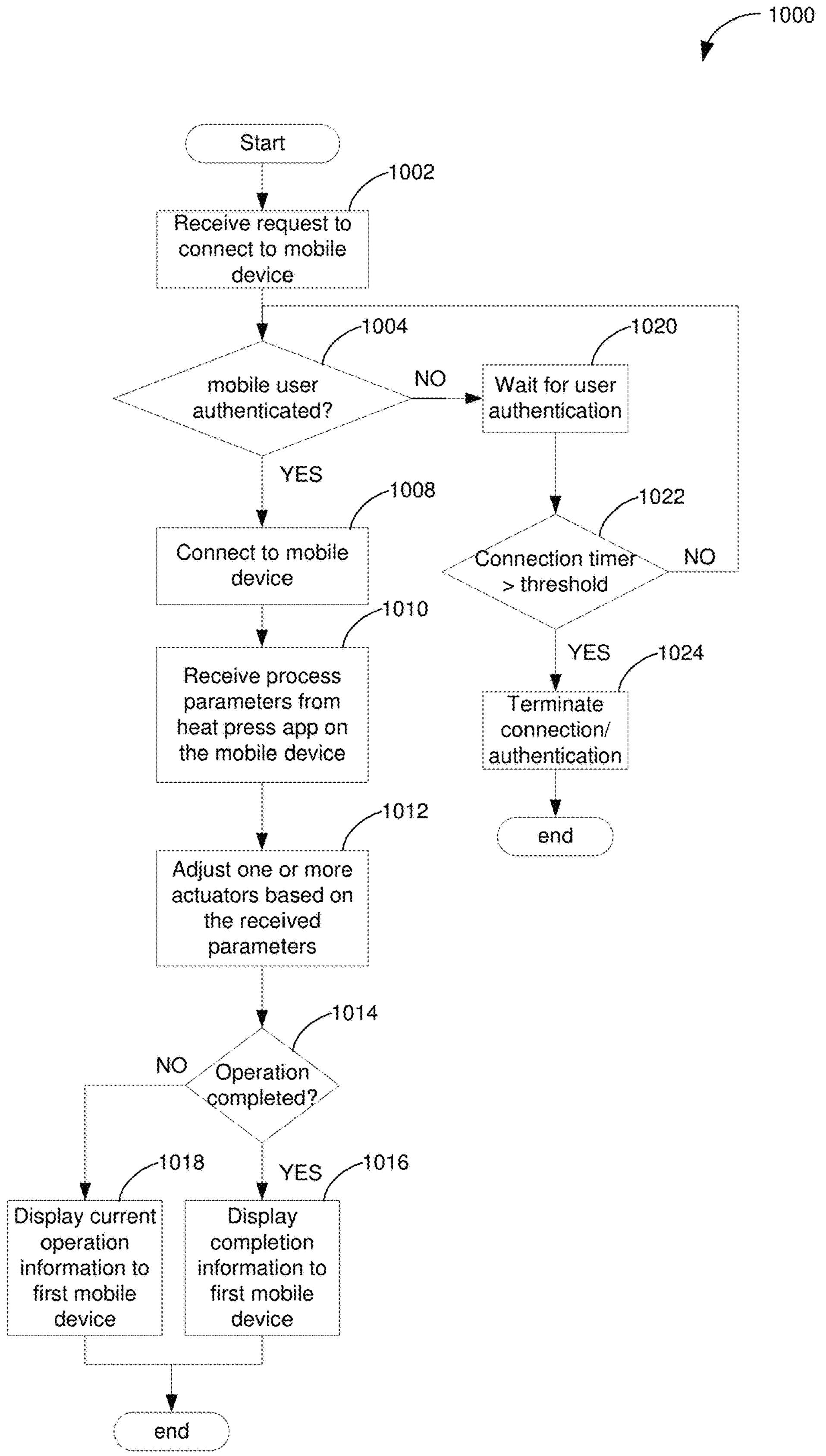
FIG. 14 shows a flow chart illustrating an example method for receiving operating parameters for a heat press operation and operating a heat press via a heat press app, such as the heat press app of FIG. 6.

The following description relates to systems and methods for operating a heat press device, such as a knee lever-transfer press of FIG. 1. The heat press device may be configured as a modular device, including a first modular unit comprising a control unit, shown in FIG. 2, a second modular unit comprising a socket, shown in FIG. 3, and a third modular unit comprising a base plate and counter plate, shown in FIG. 4. Further, the heat press device includes a display, shown in FIG. 5. The heat press device may be communicatively coupled via wireless communication, such as a Bluetooth, to a mobile device, as shown in FIG. 1. The mobile device may include an application program (also referred to as "app"), such as a heat press transfer app, for controlling operation of the heat press. The app may be launched on the mobile device by a mobile controller. The app may allow a user to establish connection with the heat press device as shown in FIGS. 7-9. Further, the app may allow the user select a specific type of job, as shown in FIG. 10, and to access a database that includes tested combinations of heat press operation data including a temperature of the counter plate, a contact pressure applied to the base plate, and a duration of heat press transfer operation for a desired set of attributes of heat press printing such as a substrate information, brand information, media information, and baseplate information, as shown in FIG. 11. An example data structure for the app is shown at FIG. 6. Further, the app may allow a user to choose a desired language and adjust temperature as shown in FIGS. 12 and 13. Furthermore, a heat press controller may receive user selected operating parameters from the mobile device via the app, and adjust one or more of the counter plate temperature, pressure and duration of heat press based on the values received, as shown in FIG. 14. Example control routines executed by the mobile controller is shown in FIGS. 7-13, and 15. An example control routine executed by the heat press controller is shown in FIG. 14. Further, an example user interface of the app is shown at FIG. 16.

By utilizing the app and controlling the heat press operation via the mobile device, the technical effect of accessing a database that includes tested operating parameters for various combinations of material, brand, media, baseplate, etc., and selecting more optimal parameter values for the heat press operation geared towards a desired approach, such as timesaving approach, may be achieved. As a result, more accurate and more efficient heat press operation for transferring motifs onto various materials may be achieved.

FIG. 1 shows a perspective view of an embodiment of a knee lever-transfer press 10 according to the present disclosure. For this purpose, the knee lever-transfer press 10 has a socket 12, which is essentially L-shaped. A knee lever arrangement 14 is provided on the socket 12.

The knee lever arrangement 14 is mounted in a pivotable manner by means of two pivot arms and two pivot joints on the section of the socket 12, which rises horizontally in the mounted state. The two pivot arms are connected to one another in a pivotable manner by two further pivot joints and two retaining rods provided at the pivot joints.

Furthermore, the knee lever-transfer press 10 has a base plate 16 and a heatable counter plate 18 which can be pivoted towards the base plate 16. The knee lever-transfer press may be alternatively referred to as heat press in this disclosure, and the terms may be used interchangeably.

In FIG. 1, the base plate 16 and the counter plate 18 are shown in a closed position.

The base plate 16 is fastened to the socket 12, while the counter plate 18 is fastened to the knee lever arrangement 14. The knee lever arrangement 14 itself has an operating handle 20 and an adjusting screw 22. The counter plate 18 can be pivoted to base plate 16 in the region of an opening angle between ca. 40° to ca. 60°, in particular, ca. 50°. The counter plate 18 further comprises a safety tin plate 26.

The knee lever-transfer press 10 includes a control unit 30, which is also fixed in the socket 12. In the mounted state, the control unit 30 is fastened in the raised L-part 32 in a corresponding control-unit receiving 34. The fastening can be effected, in particular, by means of corresponding fastening screws.

The knee lever-transfer press 10 consists, as shown in the embodiment, of three modules M1, M2 and M3. The control unit 30 forms a first modular unit M1 of the knee lever-transfer press 10 and the socket 12 forms a second modular unit M2. The base plate 16 and counter plate 18 also form a third modular unit M3.

Figure 2:
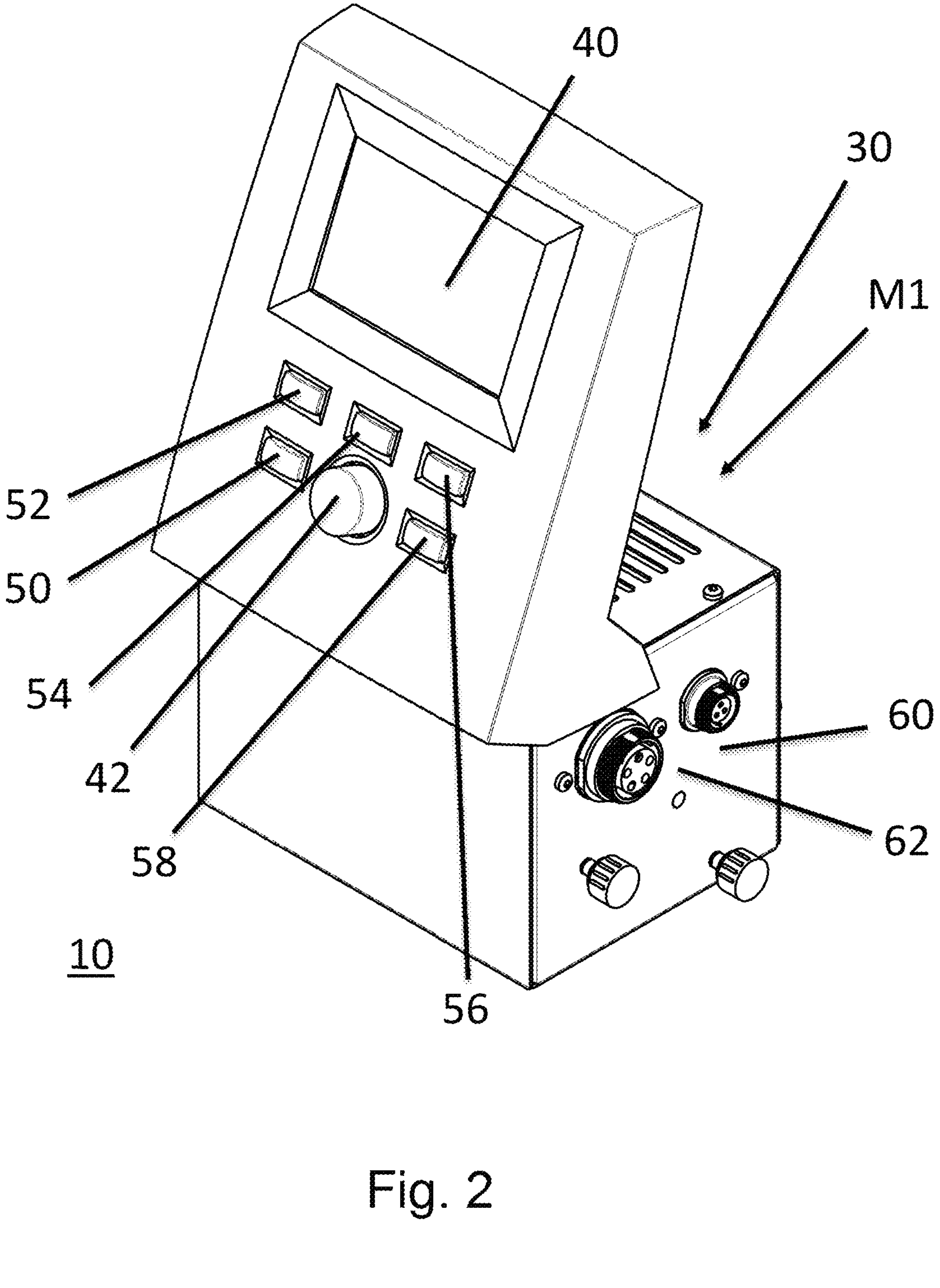
FIG. 2 shows a perspective view of a first modular unit of the knee lever-transfer press, namely the control unit.

FIG. 2 shows the first module M1, which is formed by the control unit 30.

The control unit 30 comprises a control socket housing in which the electronics necessary for the open-loop control and/or closed-loop control of the knee lever-transfer press 10 are accommodated. The control unit 30 also has a display 40. The display 40 is attached to the control socket housing and is formed as an electronic display unit inclining and protruding against the socket housing.

Further, the control unit 30 has a rotary button 42 and actuating buttons 50, 52, 54, 56, and 58.

Furthermore, the control unit 30 has a wireless interface 60, by means of which the control unit 30 can be communicatively coupled to a mobile terminal device 70. For this purpose, a wireless interface 62 is also provided, which is designed as a Bluetooth interface. The Bluetooth interface 62 is a Bluetooth 4.0 interface. In principle, however, any other wireless transmission standard is conceivable. The mobile device 70 includes a controller (not shown) comprising a processor (not shown) and memory (not shown).

The control unit 30 may further include a controller 44. The controller 44 is shown in FIG. 1 as a microcomputer, including microprocessor unit 46, input/output ports 48, an electronic storage medium for executable programs and calibration values shown as read only memory chip 50 in this particular example, random access memory 52, and a data bus. The controller may receive input data from the various sensors or buttons, process the input data, and trigger the actuators in response to the processed input data based on instruction or code programmed therein corresponding to one or more routines. Storage medium read-only memory 54 can be programmed with computer readable data representing instructions executable by processor 46 for performing the methods described below as well as other variants that are anticipated but not specifically listed. An example control routine that may be executed by controller 44 are described herein with regard to FIG. 14.

The control unit 30 may be configured to send control signals to one or more actuators of the knee lever-transfer press 10 based on input received from one or more of the mobile device 70 and the rotary button 42 and actuating buttons 50, 52, 54, 56, and 58. In one example, the inputs may include a temperature of the counter plate 18, a contact pressure between the base plate 16 and the counter plate 18, and a duration of maintaining the contact pressure between the base plate and the counter plate. The various actuators may include, for example, a motor for pivoting the counter plate to the base plate. Further, the control unit 30 may send control signals to a heating element (not shown) of the counter plate 18 to adjust a temperature of the counter plate 18 based on input received from one or more of the mobile device 70 and the rotary button 42 and actuating buttons 50, 52, 54, 56, and 58. The control unit 30 may also receive signals from a temperature sensor coupled to the base plate The mobile device 70 may be communicatively coupled to a network 80 such as a cloud computing system via wireless communication, which may be Wi-Fi, Bluetooth, a type of cellular service, or a wireless data transfer protocol. The network 80 may store heat press data, including data regarding jobs performed by the knee lever-transfer press 10. As such, this connectivity where the heat press data is uploaded, also referred to as the "cloud", may be a commercial server or a private server where the data is stored and then acted upon by optimization algorithms. The algorithm may process data from a single heat press, a group of heat press devices, or a combination thereof. The algorithms may further take into account the system limitations, produce heat press parameters, and send them back to the mobile device where they are applied.

Figure 3:
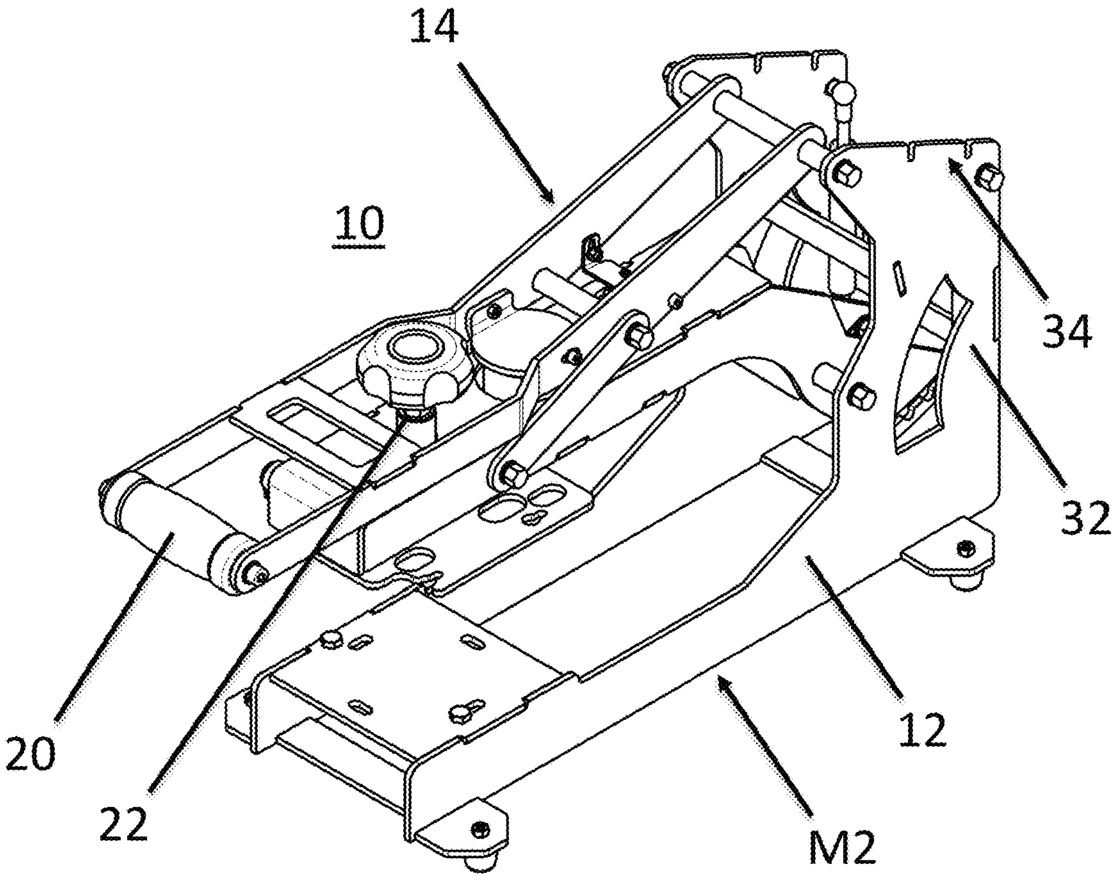
FIG. 3 shows a front view of another second modular unit of the knee lever-transfer press, namely the base plate and the heatable plate of the knee-lever-transfer press.

FIG. 3 shows a perspective view of the second module, namely the socket module M2.

The second module M2 forms the mechanical base of the knee lever-transfer press 10 and essentially consists of the socket 12 as well as the knee lever arrangement 14.

Figure 4:
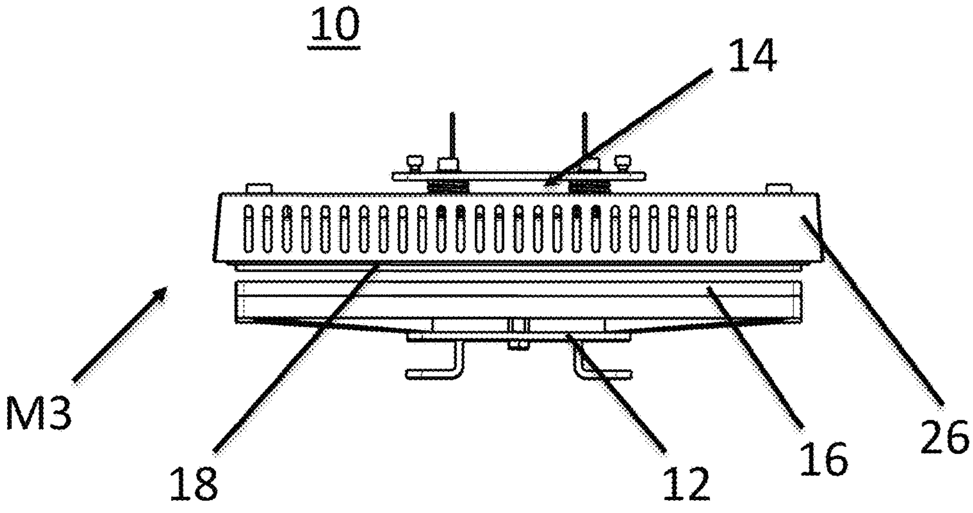
FIG. 4 shows a perspective view of a third modular unit of the knee lever-transfer press, namely the base.

FIG. 4 shows the third module, namely the module consisting of the heated base plate 16 and the pivotable counter plate 18, called module M3.

Figure 5:
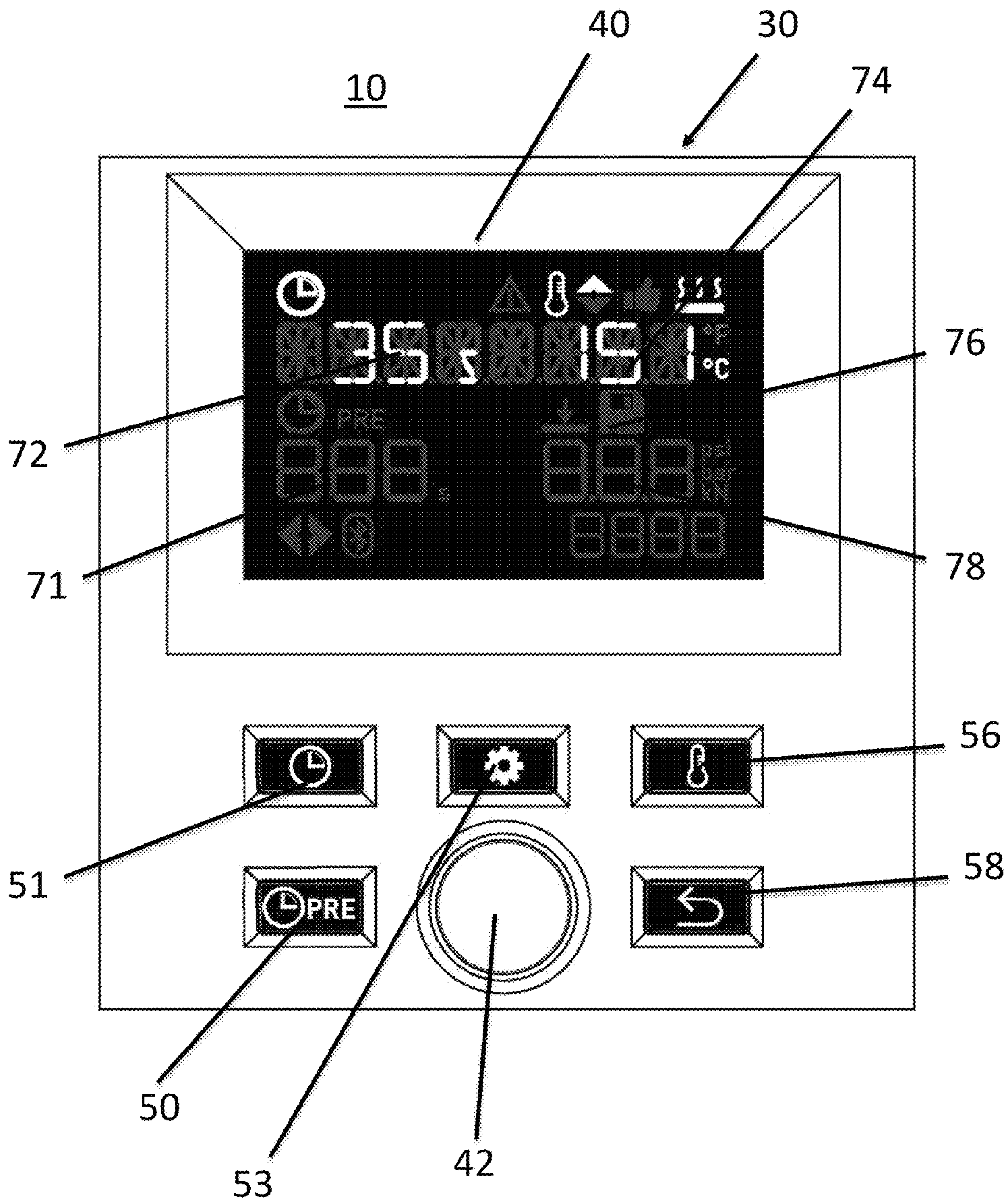
FIG. 5 shows a view of the display of the control unit of the knee lever-transfer press.

FIG. 5 further shows a detailed view of the display 40 of the knee lever-transfer press 10.

The actuating buttons 50, 52, 54, 56, 58 are arranged below the display 40 in a planar manner around the rotary button 42.

Displays 71, 72, 74, 76 and 78 are also present in the display 40 in separate display areas. The function of the knee lever-transfer press 10 can now be described as follows:

In principle, the temperature of the counter plate 18 as well as the duration or process duration of the transfer can be controlled in an open-loop and/or closed loop manner with the control unit 30.

By means of the rotary button 42, according to FIG. 5, the so-called “pre-pressing” can be activated for the next pressing process with a preset time.

The “pre-pressing” is used, for example, for pre-pressing textiles to smooth the fibers. After the pressing process, the pre-pressing is deactivated again. The pre-pressing can either be stopped or interrupted by the control unit 30 after a certain adjustable period of time automatically or manually by the push of a button. When activated, the time and pre-symbol below in the display 40 will light up with the corresponding time display. This then runs backwards to zero during pressing. The symbol and the time are then switched off again. A longer pressing of the actuating button 50 (in particular, longer than 3 seconds) activates the setting mode for the preset time analogously to the time setting. A blinking display of the corresponding symbol then takes place in the display 40. The time can then be increased by clockwise rotation of the rotary button 42, and counterclockwise rotation lowers the setting. The value is stored by pressing the rotary button 42 or also by pressing the actuating button 50. After 10 seconds without input, the input mode will cease automatically. By pressing the operation button 58, the input mode is ended and the display returns to the original value again. In the settings menu, the “pre-pressing” may be permanently activated and deactivated.

By pressing the actuating button 56, the set values can be changed, in particular, the set values with regard to the temperature. The temperature can be adjusted within a range up to a maximum of approx. 225° C.

To protect a user from such high temperatures, the counter plate 18 further comprises a safety tin plate 26, which prevents direct contact with the heatable counter plate 18, and thus also with the base plate 16 in the closed state of the knee lever-transfer press 10. This ensures that the user of the knee lever-transfer press 10 cannot touch the hot elements of the counter plate 18. The contact pressure of the base plate 16 and the counter plate 18 relative to one another can, moreover, be adjusted by means of the adjusting screw 22. However, it is also possible to adjust the contact pressure of the base plate 16 and the counter plate 18 to one another from the control unit 30 and by means of an actuator. In one example, the actuator may be a pneumatic actuator.

Again, the temperature can be increased or decreased accordingly by turning the rotary button 42 clockwise or counter-clockwise. Pressing the actuating button 58 terminates the input mode. Indicated in the display 40 are displays 71, 72, 74, 76 and 78. The display 78 is activated when the heater is running. Due to the heating phase, however, the presumable residual heating time is displayed as a moving text every 10 seconds for 3 seconds instead of the current temperature. Further symbols can be activated if the actual temperature corresponds to the set temperature, for example a thumb-up button. A warning symbol in the form of an exclamation point may, for example, be displayed on the display 40 during faults or the like. The processing times can be set via the actuating button 52. The value can also be adjusted here by turning counter-clockwise or clockwise. By pressing the actuating button 52 or by pressing the rotary button 42, the value can be entered.

A return to the display mode and a termination of the input mode can be effected, for example, by pressing the actuating button 58. Various setting levels and menus can be achieved by means of the operating button 54. For example, the following functions can be achieved here in the following menu guidance. For example, by pressing the actuating button 54 for 2 seconds an input menu can be obtained. Through the corresponding settings in the input menu the rotary button 42 can be used to scroll through. By pressing the rotary button 42, the current setting is entered. Turning the rotary button 42 selects values within the setting. Pressing the rotary button 42 results in saving the value and jumping out of this input menu. If desired, the menu can also be exited by pressing the actuating button 58.

Settings can be particularly:

PERMANENTLY ACTIVATE “PRE-PRESSING” ON/OFF
SOUND ON/OFF
ON/OFF
SLEEP MODE—DEFINE TIME—TIME IN MINUTES
SLEEP MODE—DEFINE TEMPERATURE—TEMPERATURE IN DEGREES
AUTO-OFF—DEFINE TIME—TIME IN MINUTES
TEMPERATURE-OFF—TEMPERATURE IN DEGREES (+/−)
SELECT CELSIUS/FAHRENHEIT—BY MEANS OF SYMBOLS TO THE UPPER RIGHT “° C.” OR “° F.”
SUPPORT VALUES LIKE PRODUCT CODE OR FIRMWARE
BLUETOOTH SETTINGS
  ON/OFF
  SEARCH/COUPLE DEVICE
  DELETE DEVICE
  SELECT PIN.

Via the wireless interface 62, a smartphone or tablet or another electronic mobile terminal device, such as mobile device 70, can be connected to the control unit 30 via an application (app), such as a heat press application (heat press app), by means of Bluetooth 4.0. For example, a user may launch the heat press application in order to determine one or more operating parameters of the knee lever-transfer press 10 for transferring a desired print onto a material. A memory of the mobile device 70 can be programmed with computer readable data representing instructions executable by the mobile processor for performing the methods described below as well as other variants that are anticipated but not specifically listed. Example routines executed by the mobile controller will be described with respect to FIGS. 7-13 and FIG. 15.

The control unit 30 can thus be controlled via the wireless interface 60 by means of the mobile terminal device 70. The actual control of the knee lever-transfer press 10 can then be controlled via the app. In addition, the app allows the user to select setting functions, which go beyond the actual control functions of the control unit 30.

The app can be a transfer app that allows the user to select the transfer object and the transfer medium appropriately (e.g., flock transfer with the flock foil of a particular manufacturer, and the medium to be printed as the T-shirt).

In such a case of selection, several possible and proven parameter sets will already be selected by the transfer app that are optimally adapted to the circumstances and from which the user can choose the appropriate set for his application and situation. A central part of the app is a feature that allows access to a database, such as the network 80, via a wireless interface and a wireless network.

In this database, pairs of values or value tuples determined based on test series are stored, which represent the relationship between temperature, time and pressure of most different applied transfer media. Further parameters such as room temperature and other environmental parameters can be calculated or can be determined via further sensors and incorporated into the transfer specifications.

In addition, the app can be used to display further information on transfer media, warning notices and corresponding processing instructions that support further processing. By means of such a setup, the user is allowed to carry out a perfect and durable transfer under all conditions and without prior knowledge.

In particular, a knee lever-transfer press 10 according to the present disclosure, especially the above disclosed embodiment according to FIG. 1 to 5 may also be controlled by means of the app, which may be used to control machine parameters of the knee lever-transfer press 10. Especially, such an app may be used for a heat press machine in general.

This application may also be connected by means of a wireless connection with the heat press machine, especially the knee lever-transfer press 10 as described above.

As already mentioned, heat presses are commonly used to transfer graphics on garments or other textile material. Examples for transfer technologies are hot-melt glue based material, toner or inkjet transfer, sublimation or other technologies involving heat and pressure.

Without the app-controlled heat-press, users need to do a testing procedure to find out the best settings for each transfer technology. The manufacturers of these media usually provide recommended settings for time and temperature but in reality these parameters depend on the garment and the heat press that is used.

The database may contain a wide range of materials available on the market that are used with a heat transfer press. With this database, the users save time for testing and can select from a broader range of tested parameters for each material. In addition, by increasing the pressure through the use of small base platens, the transfer time can be significantly reduced.

Possible controlling heat press parameters may be inter alia, but not limited to time
temperature
pressure
pre-pressing.

Instead of a single set of pressure, time and temperature setting, the app accesses a database with a wide verity of tested settings. With multiple sliders, the user can adjust each of the parameters. Once a parameter has been changed by the customer, the remaining sliders are adjusted automatically to be invalid on a tested range.

The software application makes it not possible to select a setting that has not been tested for satisfactory results. The range of tested settings is visible to the customer, for example through a colored scale on the slider and another method of marked tested settings.

Moreover, the application stores all the jobs the customer has produced with the heat press machine. This way, the customer can re-do jobs at a later time using the same parameters as stored before.

Jobs can be stored on-device and in a cloud database, such as network 80, to facilitate data migration to a different device.

There may be further options like a material order system
voice control
gesture control
predictive maintenance
custom assistance
account management.

Regarding the functionality of a material order system, the application may offer the possibility to directly order transfer media that is used in a job from the customers supplier. The application will then automatically place the order on the suppliers website or online-shop or shop or send an e-mail order like.

In connection with the functionality voice control, the use of the heat press may be facilitated. In particular, the user may control the application using his voice, e.g. "Create a new job", "Order 10 yards of the current material in red".

With the help of an optional voice control skill, like Alexa, Siri or other possible voice control systems, all voice commands can be also issued through an existing Amazon Alexa enable device instead of a direct voice control system provided by the app.

Moreover, there may be also a gesture control system. For example, by means of a mobile device camera, on which wherein on the mobile device the app is installed, gestures can be used to control settings and the heat press hardware.

On a pneumatic double shuttle heat press for example waving hands left and right can initiate movement of the press from left to right and waving from top to bottom initiate the pressing procedure. Additionally, also the Accelerometer of the mobile device might be used so that by doing the movements with the mobile phone such steering may be used for the gesture control.

There may be also a predictive maintenance. As mechanic machinery may suffer from wear, occasional maintenance may be required for the heat press. With the help of sensors in the heat press and data like the measured working hours or pressing procedures, necessary maintenance can be recognize and thus machine failures may be reduced. In particular, it may be possible to order the needed replacement parts well ahead before a failure of such a part. In the customer assistance functionality, the following problem may be addressed: In case users run into problems by using heat transfer applications, the app can automatically provide custom assistance by assessing a frequently ask questions (FAQ) side with common errors. In addition, the users may fill out a help form including a photo and out parameters and send so data are transferred directly from the app.

Turning now to FIG. 6, an example data structure and data storage of an app, such as a heat press app, is shown. Specifically, FIG. 6 illustrates a logical data structure for the various parameters of a knee lever-transfer press, such as the knee lever-heat press 10 of FIG. 1, and the relationship between various parameter data. The data may be stored in a database, such as network database 80 of FIG. 1. A user of the knee lever-transfer press may access the database via the app. In one example, the data for heat press operating parameters stored in the database may be obtained by testing various operating parameters of the heat press, such as a temperature of a counter plate, a contact pressure between a base plate of the heat press and the counter plate, and a duration of application of heat to transfer prints onto a desired medium. That is, a temperature data, a pressure and a time data for the heat press, are determined based on testing various combinations of time, pressure, and temperature for different types of materials, and optimizing the temperature, pressure, and time for the materials. Thus, by utilizing the database, via the app, for determining one or more operating parameters for a heat press operation, more accurate temperature, time, and pressure values may be obtained.

The data storage 100 includes temperature unit data 110 and language data 120. The temperature unit data 110 further includes name data 112 and symbol data 114. The language data 120 comprise name data 122 and code data 124.

In connection with the temperature data 110 and the language data 120 and related to these kind of data, users setting data 130 are provided and stored in the data storage means. The users setting data 130 are related to user data 140. The user data 140 comprise name data 142, e-mail data 144, password data 146 and token data 148. Furthermore, the user data 140 are related to press data 150 and job data 160. The press data 150 comprise name data 151, serial data 152, address data 153, pin data 154, time data 155 and total press count 156.

The job data 160 comprise data related to the name 161, favorite data 162, type data 163, rating data 164, notes data 165, transfer count data 166, pre-pressing mode data 167, pre-pressing time data 168, pressure data 169, temperature data 170 and time data 171.

Furthermore, the job data 160 are related to cover data 180, substrate data 190, medium data 200 and base plate data 210. The cover data 180 comprises name data 181, description data 182 and time modification data 183. The substrate data 190 comprise name data 191 and description data 192.

The medium data 200 comprise name data 201 and description data 202. The base plate data 210 comprise name data 211, description data 212, pressure high data 213, pressure medium data 214 and pressure low data 215. The medium data 200 are related to brand data 220 and result data 230.

The result data 230 relates also to the substrate data 190. The result data 230 are related to result data point data 240. The brand data 220 comprise name data 221, description data 222 and logo data 223. The result data 230 comprise date related to pressure 231, temperature start data 232, temperature step data 233, time start data 234 and time step data 235. The result data point data 240 comprise temperature index data 241, time index data 242, work start data 243, official data 244.

Next, FIG. 7 shows a flow chart illustrating an example method 300 for establishing communication between an app, such as a heat press app, and a device, such as a knee lever-transfer press 10 of FIG. 1 via Bluetooth. Method 300 may be executed by a controller of a mobile device, such as device 70 at FIG. 1 communicating with a database, such as database 80 at FIG. 1. Method 300 may be executed based on instructions stored within a memory of the mobile device controller and in conjunction with inputs received from a user via a user interface of the mobile device.

Method 300 may begin when a user launches the heat press app via the mobile device. Thus, the heat press app is started in step 300. In step 301, method 300 includes displaying a list of known devices via the user interface of the mobile device.

Next, in step 302, method 300 includes initiating a scan for devices.

During the scanning process in step 303, method 300 includes indicating scanning progression to the user.

Next, in the decision point 304 it will be determined, whether devices are found. If no devices are found in step 305*a*, a message indicating that no devices are found is displayed to the user. If devices are found, the devices discovered via the scan will be displayed in step 305*b*.

Next, at 306, method 300 awaits a user action. If the user wants to restart the scan, then the transfer app goes back to step 302. If there is a known device found, then depending on the user interaction in step 307 this device is checked and then the connection will be verified.

If the connection is ok, which is checked in step 308, then method 300 includes confirming and establishing the connection in step 309, which is the end of the connection process. If in step 308 the connection cannot be established, then in step 310 the user will be asked, if the Bluetooth PIN has changed.

If the Bluetooth PIN has changed, which is then checked with user interaction in step 311 and this is positively confirmed, then user will be asked for the Bluetooth PIN in step 312. After insertion of the Bluetooth PIN then the app goes back to step 307 to verify the connection.

If in step 311 no Bluetooth PIN can be inserted, then there will be a step back to step 306. If in step 306 a connection to a new device is selected, then in step 313 the user will be asked to insert the Bluetooth PIN.

If the PIN is entered, then method 300 includes, verifying the connection in step 314.

If in step 314 the connection could be verified and then the connection is ok after the check according to step 315, then in step 316 method 300 includes requesting the user to insert the name for the press. If the name is entered, method 300 includes storing the device in step 317. After step 317 the connection process ends in step 309. If in step 315 the connection could not be established, then step 313 will be repeated.

Next, FIG. 8 shows a flow chart illustrating an example method 400 for user authentication for operating a heat press, such as knee lever-transfer press 10 at FIG. 1. Method 400 may be performed after establishing a wireless connection via Bluetooth, for example, between a mobile device, such as device 70, and the heat press via the app. Method 400 may be executed by a controller of a mobile device, such as device 70 at FIG. 1 communicating with a database, such as database 80 at FIG. 1. Method 400 may be executed based on instructions stored within a memory of the mobile device controller and in conjunction with inputs received from a user via a user interface of the mobile device.

In step 402, method 400 includes checking if the credentials of the user are stored.

Next, in step 404, method 400 includes determining whether the credentials are stored or not stored. If the credentials are stored, then the workflow continues with step 406, where the stored credentials will be verified.

If in step 408 the credentials are found to be valid, then the workflow continues with step 410, which is the successful authentication process end step. If the credentials are invalid according to the check in step 408, then in step 412 method 400 includes preparing new anonymous credentials.

Next, in step 414 method 400 includes storing the credentials will be stored. It may be noted that method 400 may be stopped any time upon timeout or explicit exit request of the user.

FIG. 9 shows a flow chart illustrating another example method 500 for connection of the app in the mobile device with the heat press.

In step 510, method 500 includes performing two tasks at the same time, including displaying a list of known heat presses in step 510*a* and the start of a background scanning in step 510*b*. In step 510*b*, which is scanning for heat presses in the background, method 500 performs step 510*c*, which includes a scan for heat presses, followed by an update online status of known heat presses 510*d* and an update list of nearby heat presses in step 510*e*.

Next, method 500 includes checking whether a successful scan can be performed in step 510*f*. If this scan process is positive, then the scanning will be stopped in step 510*g*. Otherwise it will be continued with step 510*c*.

After step 510, the app is ready for input in step 512 and then two processes are in parallel, which includes, in step 514, connecting to a known heat press and in step 516, paring the heat press.

After method 500 includes determining whether a successful connection could be established in step 518. If this is not positive, then in step 520 the whole process is stopped or aborted. Otherwise, a connection is established and then the background scanning will be stopped in step 522.

The workflow of paring a new heat press in step 516 includes several steps, which are described below:

In step 516*a*, method 500 includes, establishing a connection to the heat press. In step 516*b* the user will be asked for the Bluetooth PIN, followed by a verification of the connection in step 516*c*. After that a check routine in step 516*d* is established, where it is checked, whether the connection attempt succeeded or failed. If the connection failed, then method 500 includes informing the user in step 516*e*.

In check step 516*f*, method 500 includes either aborting or retrying with a return to step 516*b*. If the process is aborted then the end of process of paring a new heat press is reached in 516*g*. In case that in step 516*d* a successful verification of the connection can be done, then the user will be asked in step 516*h* for a heat press name. Moreover, in step 516*i* a new heat press will be stored via the back end API.

Next, step 514 is also described in greater detail below. In step 514*a*, method 500 includes establishing the connection to the heat press. Then in step 514*b*, method 500 includes verifying the connection.

If in step 514*c* the connection cannot be verified and the connection failed, then in step 514*d*, method 500 includes informing the user. Then user can decide in step 514*e*, whether he wants to retry abort or update a PIN.

If the user decides to update the PIN then in step 514*f*, method 500 includes requesting a new PIN and then method 500 continues with step 514*b*.

If the user decides to abort the process then the method ends in step 514*g*.

If the user wants to retry, method 500 includes returning to step 514*b*. If the connection verification is successful, then step 514*h* is reached.

FIG. 10 shows a flow chart illustrating an example method 600 for loading a job for a heat press, such as knee lever-transfer press 10 at FIG. 1. Method 600 may be executed by a controller of a mobile device, such as device 70 at FIG. 1 communicating with a database, such as database 80 at FIG. 1. Method 600 may be executed based on instructions stored within a memory of the mobile device controller and in conjunction with inputs received from a user via a user interface of the mobile device.

Method 600 begins at 610. In step 610, method includes evaluating a context of the job. Accordingly, in step 612, method 600 includes performing a check as to whether the job is related to a specific type of job or any type of job. If the job is related to a specific type of job, then in step 614, method 600 includes fetching jobs of specific type from the back end database, such as database 80 at FIG. 1. If the job is determined to be of any type, method 600 includes, in step 616, fetching all jobs from the back end.

Then in step 618, method 600 includes displaying the job list.

Next, at step 620, the user may select a job. Subsequently, method 600 includes, in step 622, opening a page for a job type with a selected job.

FIG. 11 shows a flow chart illustrating an example method 700 for executing a comfort mode setup of the heat press app. Method 700 may be executed by a controller of a mobile device, such as device 70 at FIG. 1 communicating with a database, such as database 80 at FIG. 1. Method 700 may be executed based on instructions stored within a memory of the mobile device controller and in conjunction with inputs received from a user via a user interface of the mobile device.

In the comfort mode setup, in a first step 702, method 700 includes fetching the substrates from a back end, such as database 80. Next, in step 704, method 700 includes, displaying the substrates via a user interface of the mobile device 70. Next, method 700 includes, in step 706, waiting for a user to select a substrate from the list of substrates displayed. Upon the user selecting a substrate, method 700 includes, in step 708, fetching brands from the back end, and in step 710 displaying the brands.

Next, in step 712, method 700 includes, waiting for the user to select a brand.

Upon the user selecting a brand, method 700 includes in step 714, fetching media from the back end, and in step 716 displaying the media. In step 718, method includes waiting for the user to select respective media.

Upon selecting media, method 700 includes in step 720 fetching base plates from the back end, and in step 722, displaying the available base plates. In step 724, method 700 includes waiting for the user to select the respective base plate.

Next, in step 726, method 700 includes fetching the results from the back end based on the selected information. The results may include one or more of a temperature of a contact plate, a contact pressure of the contact plate with a base plate, and a duration of heat press operation.

Next, in step 728, method 700 includes decrypting results via the heat press, which includes transmitting the results to a control unit of the heat press for decryption and receiving the decrypted results from the heat press.

Next, upon receiving the decrypted results from the heat press control unit, method 700 includes, in step 730, calculating the sliders and the default values. Calculation of the sliders include determining a temperature range and a corresponding time range for operating the heat press for the specific selected job type.

Next, in step 732, method 700 includes saving the job via the back end. Method 700 subsequently ends. It will be appreciated that step 702 to 732 follows step by step without any check routine in between.

FIG. 12 shows a flow chart illustrating an example method 800 for changing a language for the app, the language displayed on a user interface of the heat press app executed on the mobile device. Method 800 may be executed by a controller of a mobile device, such as device 70 at FIG. 1 communicating with a database, such as database 80 at FIG. 1. Method 800 may be executed based on instructions stored within a memory of the mobile device controller and in conjunction with inputs received from a user via a user interface of the mobile device.

In a first step 802, method 800 includes displaying a list of registered languages. Next, in step 804, method includes waiting for the user to select a language. Next, upon the user selecting a language, method 800 includes in step 806, storing the language the back end.

Next, in step 808, method 800 includes updating the app language, and in 810, closing the language page.

Method 800 subsequently ends.

Next, FIG. 13 shows a flowchart illustrating an example method 900 for changing a temperature unit is shown. Method 900 may be executed by a controller of a mobile device, such as device 70 at FIG. 1 communicating with a database, such as database 80 at FIG. 1. Method 900 may be executed based on instructions stored within a memory of the mobile device controller and in conjunction with inputs received from a user via a user interface of the mobile device.

In a first step 902, method 900 includes, displaying a list of registered temperature units. Next, in step 904, method 900 includes waiting for the user to select a temperature unit.

Then, upon the user selecting the temperature unit, in step 906, method 900 includes storing the selected temperature unit via the back end. Next, in step 908, method 900 includes updating the temperature unit.

Then in step 910, method 900 includes closing the temperature unit page. Method 900 subsequently ends.

Turning next to FIG. 14, a flow chart illustrating an example method 1000 for operating a heat press, such as knee lever-transfer press 10 at FIG. 1, based on information received from a mobile device such as mobile device 70 at FIG. 1, communicatively coupled to the heat press via a wireless communication, such as Bluetooth, is shown. Method 1000 may be executed by a controller of the heat press, such as controller 44 at FIG. 1. Method 1000 may be executed based on instructions stored within a memory of the controller and in conjunction with one or more inputs received from a user via a user interface of the heat press and one or more inputs received via the mobile device.

Method 1000 begins at 1002. At 1002, method 1000 includes receiving a request to establish connection with the mobile device. Specifically, an app, such as a heat press app, may transmit a request to connect to the heat press via a wireless communication, such as Bluetooth.

Next, at 1004, method 1000 includes determining if the user requesting the connection is authenticated. In one example, user authentication may be confirmed based on user data stored in a database, such as database 80 at FIG. 1. For example, the mobile device may send user authentication information along with the request to connect to the heat press. In another example, the heat press controller may store user information in a memory of a control unit of the heat press.

Upon confirming user authentication, method 1000 includes at step 1008, establishing connection with the mobile device, via a wireless communication, such as Bluetooth. If user authentication is not confirmed, method 1000 proceeds to step 1020 to wait for user authentication for a threshold duration. Next, at 1022, method 1000 may determine if a duration of waiting, as determined by a connection timer, is greater than a threshold. If so, method 1000 proceed to step 1024 to terminate communication with the mobile device. Otherwise, method 1000 returns to step 1004.

Returning to step 1008, upon establishing connection with the mobile device, method 1000 proceeds to 1010. At 1010, method 1000 includes receiving one or more operating parameters for operating the heat press. The one or more parameters may include a temperature of a counter plate, such as counter plate 18, a contact pressure between a base plate, such as base plate 16 and the counter plate, and a duration (time) of maintaining the contact pressure and temperature. In some examples, the heat press controller may receive one or more results from the mobile device, such as results fetched from the database, as discussed at step 726 of FIG. 11. The one or more results may be based on user selected information regarding one or more of a substrate, brand, media, and base plate via the heat press app. Upon receiving the results from the mobile device, the heat press controller may calculate a temperature range and a time range for the user selected information for operating the heat press. Upon determining the temperature range and a time range of heat press operation (the ranges are also referred to as sliders), the heat press controller may transmit the calculated temperature and time range to the mobile device, which may then be displayed to the user via a user interface of the app. The use may then select a desired temperature and time. The user selected values of one or more of time and temperature may be transmitted to the heat press. Based on the user selected values, the heat press controller may adjust a temperature of the counterplate, a contact pressure, and a duration of contact pressure applied to the base plate as discussed below at 1010.

Returning to 1010, upon receiving the one or more operating parameters, including a temperature, pressure, and time, method 1000 proceeds to 1012. At 1012, method 1000 includes adjusting one or more actuators and a temperature of the counter plate based on the received parameters. The one or more actuators may include a motor for pivoting the counter plate to the base plate. In some example, the one or more actuators may include a pneumatic actuator for applying a contact pressure between the base plate and the counter plate.

At 1014 the method 1000 includes a decision whether the operation is completed. If yes, at 1016 the method 1000 includes "display completion information to first mobile device." If no, at 1018 the method 1000 includes "display current operation to first mobile device." Method 1000 may subsequently end.

Figure 15:
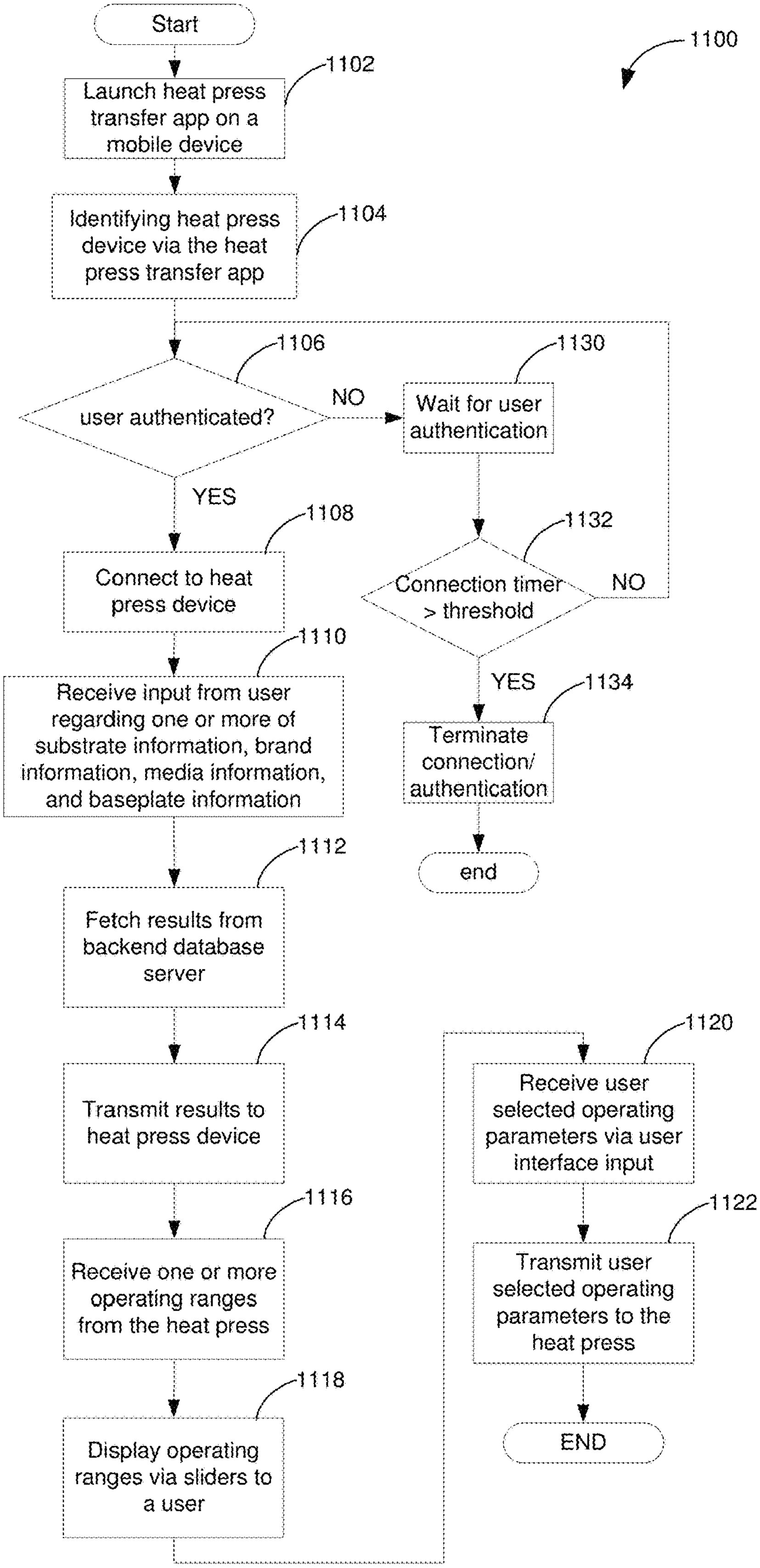
FIG. 15 shows a flow chart illustrating an example method for determining one or more operating parameters for a heat press operation and operating the heat press via a heat press app, such as the heat press app of FIG. 6.
Figure 16:
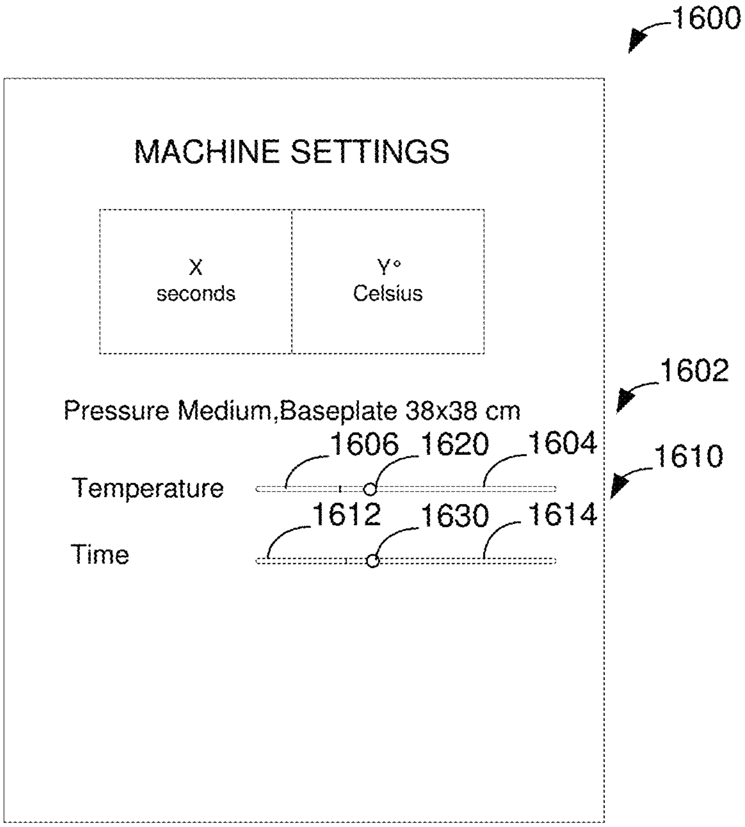
FIG. 16 shows an example user interface displayed on a mobile device via a heat press app, such as the heat press app of FIG. 6.

Next, FIG. 15 shows a high level flow chart illustrating an example method 1100 for operating a heat press device, such as knee lever-transfer press 10 at FIG. 1 via a heat press transfer app on a mobile device, such as mobile device 70 at FIG. 1. Method 1100 may be executed by a controller of a mobile device, such as device 70 at FIG. 1 communicating with a database, such as database 80 at FIG. 1. Method 1100 may be executed based on instructions stored within a memory of the mobile device controller and in conjunction with inputs received from a user via a user interface of the mobile device.

Method 1100 begins at 1102. At 1102, method 1100 includes launching a heat press transfer app on the mobile device. Next, method 1100 proceeds to 1104. At 1104, method 1102 includes identifying a heat press device among one or more heat press devices discovered by the app. For example, the transfer app may list one or more heat press device in the vicinity of the mobile device within a Bluetooth operating range. A user may then select a desired device among the listed heat press devices.

Upon identifying the heat press device, method 1100 proceeds 1106 to determine user authentication. User authentication may be performed as discussed with respect to FIGS. 7 and 9. If user is authenticated, method 1100 proceeds to 1108. Otherwise, method 1100 proceeds to 1130 to wait for user authentication for a threshold duration. Next, at 1132, method 1100 may determine if a duration of waiting, as determined by a connection timer, is greater than a threshold. If so, method 1100 proceeds to step 1134 to terminate communication with the mobile device. Otherwise, method 1100 returns to step 1106.

Next, method 1100 proceeds to 1108. At 1108. Method 1100 includes establishing connection with the selected heat press device. Next, method 1100 proceeds to 1110 to receive input from a user regarding one or more of substrate information, brand information, media information, and baseplate information via a user interface of the heat press transfer app. Details of receiving the user input is elaborated with respect to FIG. 11. Upon receiving the user input, method 1100 proceeds to 1112 to fetch results from the backend database.

Next, method 1100 proceeds to 1114. At 1114, method 1100 includes transmitting the results to the heat press device. Subsequently, at 1116, method 1100 includes receiving one or more operating ranges, such as a temperature range and a duration range from the heat press device. A contact pressure may be based on a size of the baseplate selected by the user. While the present example illustrates the heat press controller calculating the operating parameters, it will be appreciated that in some embodiments, the operating parameters (temperature and time ranges) may be calculated by a controller of the database.

Upon receiving the operating ranges, method 1100 includes, at 1118, displaying the operating ranges to a user through the user interface of the heat transfer application. In one example, the operating ranges may be indicated by sliders as shown in an example user interface of the heat press transfer app FIG. 16. Specifically, FIG. 16 shows an example user interface 1600 that may be displayed to a user. User interface 1600 shows a temperature slider 1602 and a time slider 1610. A user may select a desired temperature 1620 and a desired time 1630 by moving buttons across the sliders. The temperature slider 1602 shows a first temperature range 1604 and a second temperature range 1606. The first temperature range may indicate temperatures that are not suitable for a current heat press operation, while the second temperature range may indicate temperatures that are suitable for a successful heat press transfer operation for the baseplate, media, brand parameters selected by the user. Similarly, the time slider 1610 shows a first time range 1612 and a second time range 1614. The first temperature range may indicate durations that are not suitable for a current heat press operation, while the second temperature range may indicate durations that are suitable for a successful heat press transfer operation for the baseplate, media, brand parameters selected by the user.

Next, method 1100 includes, at 1120, receiving one or more user selected inputs including a desired temperature, a desired pressure, a desired duration from the operating ranges displayed to the user via the app.

Upon receiving the user selected input, method 1100 includes, at 1122, transmitting the one or more use selected inputs to the heat press device. Method 1100 may then end.

In this way, a heat press transfer app on a mobile device may be used to control operation of a heat press via wireless communication.

Note that the example control and estimation routines included herein can be used with various device configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to other types of heat press devices used for processing other types of material. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A heat press, comprising:

a socket;

a base plate;

a heatable counter plate pivotable towards the base plate; and a control unit including a controller and a wireless interface, the controller including executable instructions stored in non-transitory memory for receiving one or more operating parameters from a mobile device, and adjusting one or more actuators of the heat press based on the one or more operating parameters;

wherein the control unit is configured as a first modular unit of the press, the socket is configured as a second modular unit, the base plate and the counter plate are configured as a third modular unit;

wherein one or more of the first modular unit, the second modular unit, and the third modular unit are separable from each other;

wherein the mobile device includes an application program;

wherein a database of the application program includes tested combinations of heat press operation data including a temperature of the counter plate, a contact pressure applied to the base plate, and a duration of heat press transfer operation for a desired set of attributes of heat press printing; and wherein the set of attributes comprises at least a substrate information, brand information, media information, and baseplate information.

2. The heat press of claim 1, wherein the controller includes further instructions for operating the heat press in one or more of an open-loop manner and a closed-loop manner.

3. The heat press of claim 1, wherein the one or more parameters include a temperature of the counter plate, a contact pressure between the base plate and the counter plate, and a duration of the pressure applied.

4. The heat press of claim 1, wherein the control unit includes a display.

5. The heat press of claim 1, wherein the control unit has at least one actuating button, and wherein the actuating button is formed as a push button.

6. The heat press of claim 1, wherein the control unit has at least one rotary button, especially a joined rotary-push button.

7. The heat press of claim 2, wherein the wireless interface is a radio interface.

8. A method for operating a heat press, comprising:
- launching a heat press application on a mobile device;
- identifying, via the heat press application, the heat press, the heat press comprising:
  - a socket;
  - a base plate;
  - a heatable counter plate pivotable towards the base plate; and
  - a control unit including a controller and a wireless interface, the controller including executable instructions stored in non-transitory memory for receiving one or more operating parameters from the mobile device, and adjusting one or more actuators of the heat press based on the one or more operating parameters;
  - wherein the control unit is configured as a first modular unit of the press, the socket is configured as a second modular unit, the base plate and the counter plate are configured as a third modular unit;
  - wherein one or more of the first modular unit, the second modular unit, and the third modular unit are separable from each other;
  - wherein a database of the heat press application includes tested combinations of heat press operation data including a temperature of the counter plate, a contact pressure applied to the base plate, and a duration of heat press transfer operation for a desired set of attributes of heat press printing; and
  - wherein the set of attributes comprises at least a substrate information, brand information, media information, and baseplate information;
- verifying, via the heat press application, a user identification;
- establishing, via the heat press application, wireless communication between the mobile device and the heat press;
- determining, via the heat press application, one or more parameters for operating the heat press; and
- transmitting, via the wireless communication, the one or more parameters to the heat press.

9. The method of claim 8, further comprising, receiving, one or more heat press operation completion data values from the heat press; and displaying, via a user interface of the heat press application on the mobile device, the one or more heat press operation completion data values to a user.

10. The method of claim 9, further comprising, storing the one or more parameters, and the one or more heat press operation completion data values in a cloud database server communicatively coupled to the mobile device.

11. The method of claim 8, wherein determining the one or more parameters includes a user selecting one or more of a substrate information, a brand information, a media information, and a baseplate information; calculating one or more of a time range and a temperature range based on the selection and data stored on a backend server via the application; and displaying one or more of the time range and the temperature range to the user via the user interface of the heat press application.

12. The method of claim 10, wherein displaying the one or more of the time range and the temperature range includes indicating the one or more of the time range and the temperature range via sliders.

13. The method of claim 10, wherein determining the one or more parameters further includes selecting a desired temperature and a desired time from one or more of the time range and the temperature range.

14. The method of claim 8, wherein the wireless communication is established via a radio interface on the mobile device and a radio interface on the heat press.

15. The method of claim 8, further comprising, selecting a desired language for the user interface.

16. A method for operating a heat press, comprising:
- receiving, via a wireless interface on the heat press, one or more parameters for operating the heat press, the heat press comprising:
  - a socket;
  - a base plate;
  - a heatable counter plate pivotable towards the base plate; and
  - a control unit including a controller and a wireless interface, the controller including executable instructions stored in non-transitory memory for receiving one or more operating parameters from the mobile device, and adjusting one or more actuators of the heat press based on the one or more operating parameters;
  - wherein the control unit is configured as a first modular unit of the press, the socket is configured as a second modular unit, the base plate and the counter plate are configured as a third modular unit;
  - wherein one or more of the first modular unit, the second modular unit, and the third modular unit are separable from each other;
  - wherein a database of the heat press application includes tested combinations of heat press operation data including a temperature of the counter plate, a contact pressure applied to the base plate, and a duration of heat press transfer operation for a desired set of attributes of heat press printing; and
  - wherein the set of attributes comprises at least a substrate information, brand information, media information, and baseplate information; and
- adjusting one or more actuators of the heat press based on the one or more parameters.

17. The method of claim 16, wherein the wireless interface is a radio interface, and wherein the one or more operating parameters include a temperature of the counter plate of the heat press, a pressure applied to the base plate, and a duration of the pressure applied.

18. The method of claim 16, further comprising receiving one or more of a substrate information, a brand information, a media information, and a baseplate size information via the wireless interface.

19. The method of claim 16, further comprising displaying the one or more operating parameters via a display of the heat press, and transmitting a heat press completion information via the wireless interface to the mobile device communicatively coupled to the heat press.

20. The method of claim 16, further comprising storing one or more of a substrate information, a brand information, a media information, and a baseplate size information, the one or more operating parameters, and a heat press completion information on a memory of a controller of the heat press.

* * * * *